(12) United States Patent
Broughton et al.

(10) Patent No.: US 8,836,715 B2
(45) Date of Patent: Sep. 16, 2014

(54) METHOD, APPARATUS AND PROGRAM FOR PROCESSING IMAGE DATA FOR DISPLAY BY A DISPLAY PANEL OF A DISPLAY DEVICE, AND A DISPLAY DEVICE

(75) Inventors: Benjamin John Broughton, Oxford (GB); Andrew Kay, Oxford (GB); Marc Paul Servais, Oxford (GB); Paul Antony Gass, Oxford (GB); Masahiro Esashi, Osaka (JP); Kenji Maeda, Osaka (JP); Tatsuo Watanabe, Osaka (JP); Yuuichi Sato, Osaka (JP); Yoshimitsu Inamori, Osaka (JP); Takashi Yasumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 301 days.

(21) Appl. No.: 13/395,126

(22) PCT Filed: Sep. 16, 2010

(86) PCT No.: PCT/JP2010/066617
§ 371 (c)(1),
(2), (4) Date: Mar. 9, 2012

(87) PCT Pub. No.: WO2011/034209
PCT Pub. Date: Mar. 24, 2011

(65) Prior Publication Data
US 2012/0176404 A1 Jul. 12, 2012

(30) Foreign Application Priority Data
Sep. 16, 2009 (GB) .................................. 0916247.0

(51) Int. Cl.
*G09G 5/02* (2006.01)
*G06F 21/84* (2013.01)
*G09G 3/36* (2006.01)
*H04N 5/57* (2006.01)
*H04N 21/431* (2011.01)
*H04N 21/44* (2011.01)
*H04N 21/414* (2011.01)

(52) U.S. Cl.
CPC ............ *G06F 21/84* (2013.01); *G09G 2358/00* (2013.01); *G09G 3/3611* (2013.01); *H04N 5/57* (2013.01); *H04N 21/4318* (2013.01); *H04N 21/41415* (2013.01); *H04N 21/44* (2013.01)
USPC ........... 345/589; 345/426; 345/428; 345/619; 345/647; 345/214; 382/168; 348/671; 348/672; 348/673; 348/674

(58) Field of Classification Search
None
See application file for complete search history.

(56) References Cited

U.S. PATENT DOCUMENTS

RE27,617 E 4/1973 Olsen
4,764,410 A 8/1988 Grzywinski
(Continued)

FOREIGN PATENT DOCUMENTS

GB 2 413 394 A 10/2005
GB 2 428 152 A 1/2007
(Continued)

OTHER PUBLICATIONS

International Search Report for corresponding International Application No. PCT/JP2010/066617 mailed Oct. 26, 2010.
(Continued)

*Primary Examiner* — Antonio A Caschera
(74) *Attorney, Agent, or Firm* — Renner, Otto, Boisselle & Sklar, LLP.

(57) ABSTRACT

A method of processing image data for display by a display panel of a display device. The method comprises receiving main image pixel data representing a main image and side image pixel data representing a side image, and performing a mapping of the pixel data to signals used to drive the display panel. The mapping is arranged to produce an average on-axis luminance which is dependent mainly on the main image pixel data and an average off-axis luminance which is dependent at least to some extent on the side image pixel data. A compression of the main image pixel data is performed in advance of or at least partly incorporated into the mapping, the compression being performed at least partly in dependence upon the main image pixel data and at least partly in dependence upon how the off-axis luminance varies with pixel data input to the mapping.

32 Claims, 33 Drawing Sheets

(56) References Cited

U.S. PATENT DOCUMENTS

| | | |
|---|---|---|
| 4,766,023 A | 8/1988 | Lu |
| 5,147,716 A | 9/1992 | Bellus |
| 5,528,319 A | 6/1996 | Austin |
| 2007/0040780 A1 | 2/2007 | Gass et al. |
| 2009/0079674 A1 | 3/2009 | Yoshiga et al. |
| 2009/0096734 A1* | 4/2009 | Huang et al. .................... 345/89 |
| 2009/0262127 A1 | 10/2009 | Miyasaka et al. |

FOREIGN PATENT DOCUMENTS

| | | |
|---|---|---|
| GB | 2 457 106 A | 8/2009 |
| GB | 2 464 521 A | 4/2010 |
| GB | 2 473 614 A | 3/2011 |
| JP | 2008-52058 A | 3/2008 |
| JP | 2009-64025 A | 3/2009 |
| JP | 2009-204862 A | 9/2009 |
| WO | 2008/015905 A1 | 2/2008 |
| WO | 2009/057417 A1 | 5/2009 |
| WO | 2009/069048 A1 | 6/2009 |
| WO | 2009/110128 A1 | 9/2009 |

OTHER PUBLICATIONS

Form PCT/ISA/237 for corresponding International Application No. PCT/JP2010/066617 dated Oct. 26, 2010.

British Search Report for corresponding GB Application No. GB0916247.0 dated Dec. 17, 2009.

Yamada et al., "Fast Response and Wide-Viewing Angle Technologies for LC-TV Application", ASV, IDW '02 Digest, pp. 203-206.

Hanaoka et al., "A New MVA-LCD by Polymer Sustained Alignment Technology", PSA SID '04 Digest, pp. 1200-1203.

\* cited by examiner

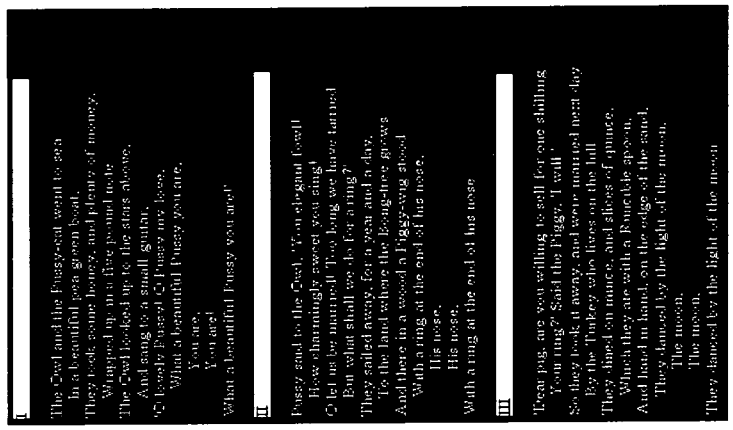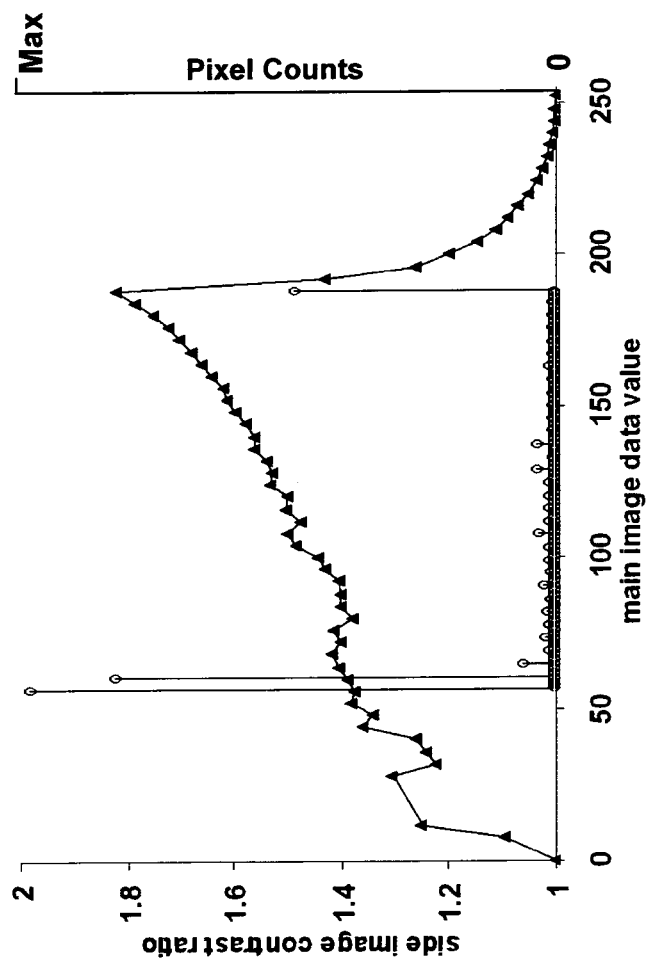
FIG. 7

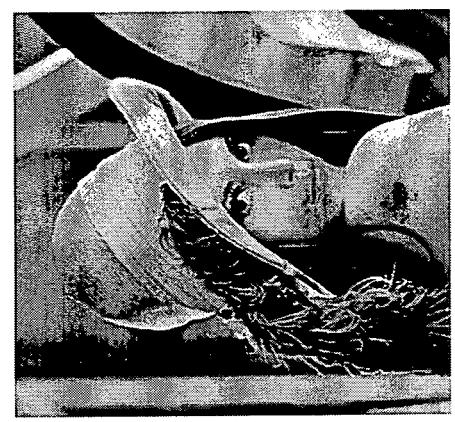
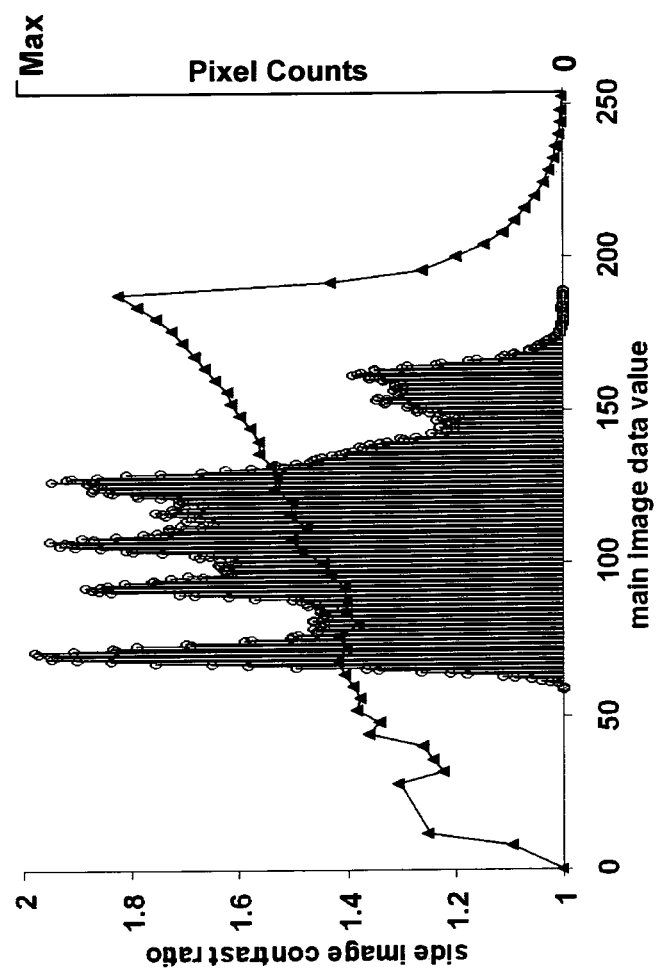
FIG. 8

FIG. 11

Comp=1 — modified bin count values (rows) × initial bin count values (columns)

| | Bin 1 | Bin 2 | Bin 3 | Bin 4 | Bin 5 | Bin 6 | Bin 7 | Bin 8 |
|---|---|---|---|---|---|---|---|---|
| Bin 1 | 1 | 0.14 | 0 | 0 | 0 | 0 | 0 | 0 |
| Bin 2 | 0 | 0.86 | 0.29 | 0 | 0 | 0 | 0 | 0 |
| Bin 3 | 0 | 0 | 0.71 | 0.43 | 0 | 0 | 0 | 0 |
| Bin 4 | 0 | 0 | 0 | 0.57 | 0.57 | 0 | 0 | 0 |
| Bin 5 | 0 | 0 | 0 | 0 | 0.43 | 0.71 | 0 | 0 |
| Bin 6 | 0 | 0 | 0 | 0 | 0 | 0.29 | 0.86 | 0 |
| Bin 7 | 0 | 0 | 0 | 0 | 0 | 0 | 0.14 | 1 |
| Bin 8 | 0 | 0 | 0 | 0 | 0 | 0 | 0 | 0 |

Comp=2

| | Bin 1 | Bin 2 | Bin 3 | Bin 4 | Bin 5 | Bin 6 | Bin 7 | Bin 8 |
|---|---|---|---|---|---|---|---|---|
| Bin 1 | 1 | 0.33 | 0 | 0 | 0 | 0 | 0 | 0 |
| Bin 2 | 0 | 0.67 | 0.67 | 0 | 0 | 0 | 0 | 0 |
| Bin 3 | 0 | 0 | 0.33 | 1 | 0 | 0 | 0 | 0 |
| Bin 4 | 0 | 0 | 0 | 0 | 1 | 0.33 | 0 | 0 |
| Bin 5 | 0 | 0 | 0 | 0 | 0 | 0.67 | 0.67 | 0 |
| Bin 6 | 0 | 0 | 0 | 0 | 0 | 0 | 0.33 | 1 |
| Bin 7 | 0 | 0 | 0 | 0 | 0 | 0 | 0 | 0 |
| Bin 8 | 0 | 0 | 0 | 0 | 0 | 0 | 0 | 0 |

Comp=3

| | Bin 1 | Bin 2 | Bin 3 | Bin 4 | Bin 5 | Bin 6 | Bin 7 | Bin 8 |
|---|---|---|---|---|---|---|---|---|
| Bin 1 | 1 | 0.6 | 0 | 0 | 0 | 0 | 0 | 0 |
| Bin 2 | 0 | 0.4 | 1 | 0.2 | 0 | 0 | 0 | 0 |
| Bin 3 | 0 | 0 | 0 | 0.8 | 0.8 | 0 | 0 | 0 |
| Bin 4 | 0 | 0 | 0 | 0 | 0.2 | 1 | 0.4 | 0 |
| Bin 5 | 0 | 0 | 0 | 0 | 0 | 0 | 0.6 | 1 |
| Bin 6 | 0 | 0 | 0 | 0 | 0 | 0 | 0 | 0 |
| Bin 7 | 0 | 0 | 0 | 0 | 0 | 0 | 0 | 0 |
| Bin 8 | 0 | 0 | 0 | 0 | 0 | 0 | 0 | 0 |

Comp=4

| | Bin 1 | Bin 2 | Bin 3 | Bin 4 | Bin 5 | Bin 6 | Bin 7 | Bin 8 |
|---|---|---|---|---|---|---|---|---|
| Bin 1 | 1 | 1 | 0 | 0 | 0 | 0 | 0 | 0 |
| Bin 2 | 0 | 0 | 1 | 1 | 0 | 0 | 0 | 0 |
| Bin 3 | 0 | 0 | 0 | 0 | 1 | 1 | 0 | 0 |
| Bin 4 | 0 | 0 | 0 | 0 | 0 | 0 | 1 | 1 |
| Bin 5 | 0 | 0 | 0 | 0 | 0 | 0 | 0 | 0 |
| Bin 6 | 0 | 0 | 0 | 0 | 0 | 0 | 0 | 0 |
| Bin 7 | 0 | 0 | 0 | 0 | 0 | 0 | 0 | 0 |
| Bin 8 | 0 | 0 | 0 | 0 | 0 | 0 | 0 | 0 |

Comp=5

| | Bin 1 | Bin 2 | Bin 3 | Bin 4 | Bin 5 | Bin 6 | Bin 7 | Bin 8 |
|---|---|---|---|---|---|---|---|---|
| Bin 1 | 1 | 1 | 0.67 | 0 | 0 | 0 | 0 | 0 |
| Bin 2 | 0 | 0 | 0.33 | 1 | 1 | 0.33 | 0 | 0 |
| Bin 3 | 0 | 0 | 0 | 0 | 0 | 0.67 | 1 | 1 |
| Bin 4 | 0 | 0 | 0 | 0 | 0 | 0 | 0 | 0 |
| Bin 5 | 0 | 0 | 0 | 0 | 0 | 0 | 0 | 0 |
| Bin 6 | 0 | 0 | 0 | 0 | 0 | 0 | 0 | 0 |
| Bin 7 | 0 | 0 | 0 | 0 | 0 | 0 | 0 | 0 |
| Bin 8 | 0 | 0 | 0 | 0 | 0 | 0 | 0 | 0 |

Comp=6

| | Bin 1 | Bin 2 | Bin 3 | Bin 4 | Bin 5 | Bin 6 | Bin 7 | Bin 8 |
|---|---|---|---|---|---|---|---|---|
| Bin 1 | 1 | 1 | 1 | 0 | 0 | 0 | 0 | 0 |
| Bin 2 | 0 | 0 | 0 | 1 | 1 | 1 | 0 | 0 |
| Bin 3 | 0 | 0 | 0 | 0 | 0 | 0 | 1 | 1 |
| Bin 4 | 0 | 0 | 0 | 0 | 0 | 0 | 0 | 0 |
| Bin 5 | 0 | 0 | 0 | 0 | 0 | 0 | 0 | 0 |
| Bin 6 | 0 | 0 | 0 | 0 | 0 | 0 | 0 | 0 |
| Bin 7 | 0 | 0 | 0 | 0 | 0 | 0 | 0 | 0 |
| Bin 8 | 0 | 0 | 0 | 0 | 0 | 0 | 0 | 0 |

Comp=7

| | Bin 1 | Bin 2 | Bin 3 | Bin 4 | Bin 5 | Bin 6 | Bin 7 | Bin 8 |
|---|---|---|---|---|---|---|---|---|
| Bin 1 | 1 | 1 | 1 | 1 | 0 | 0 | 0 | 0 |
| Bin 2 | 0 | 0 | 0 | 0 | 1 | 1 | 1 | 1 |
| Bin 3 | 0 | 0 | 0 | 0 | 0 | 0 | 0 | 0 |
| Bin 4 | 0 | 0 | 0 | 0 | 0 | 0 | 0 | 0 |
| Bin 5 | 0 | 0 | 0 | 0 | 0 | 0 | 0 | 0 |
| Bin 6 | 0 | 0 | 0 | 0 | 0 | 0 | 0 | 0 |
| Bin 7 | 0 | 0 | 0 | 0 | 0 | 0 | 0 | 0 |
| Bin 8 | 0 | 0 | 0 | 0 | 0 | 0 | 0 | 0 |

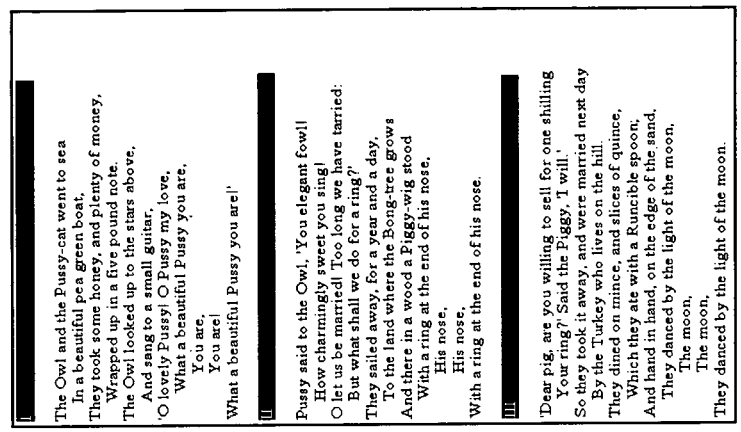
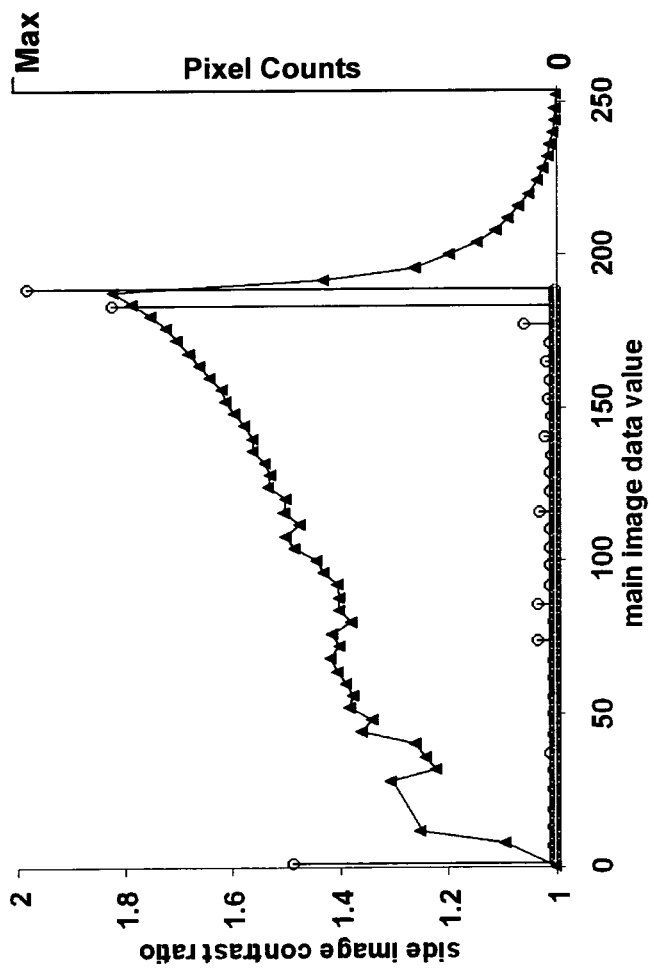
FIG. 13

FIG. 20
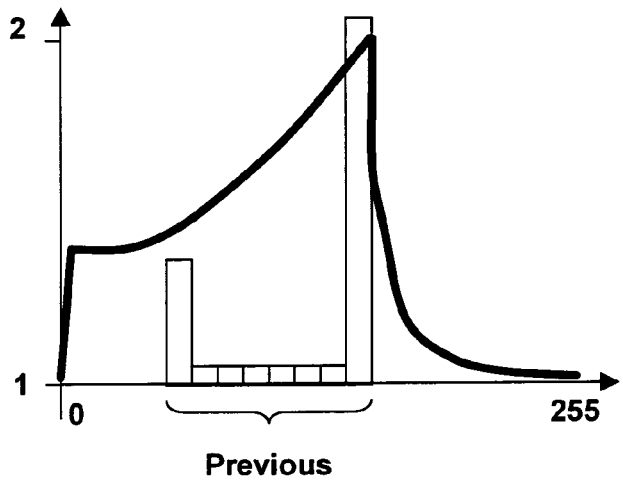
Previous
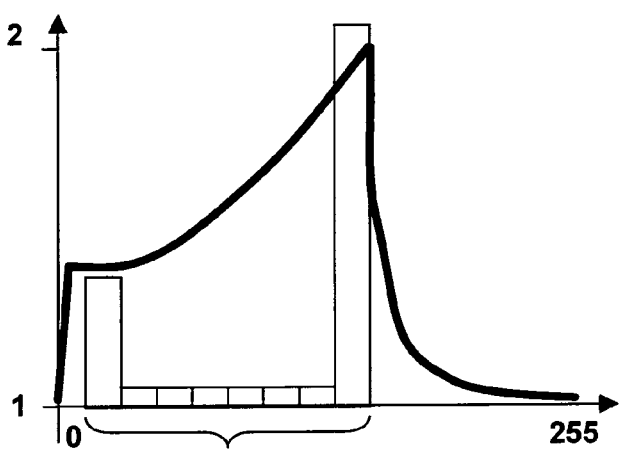
Improved

FIG. 21
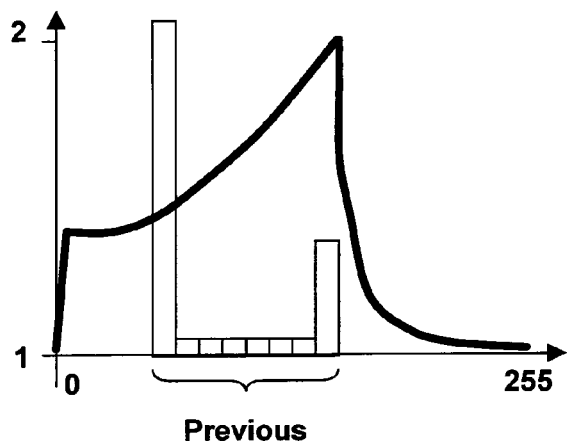
Previous
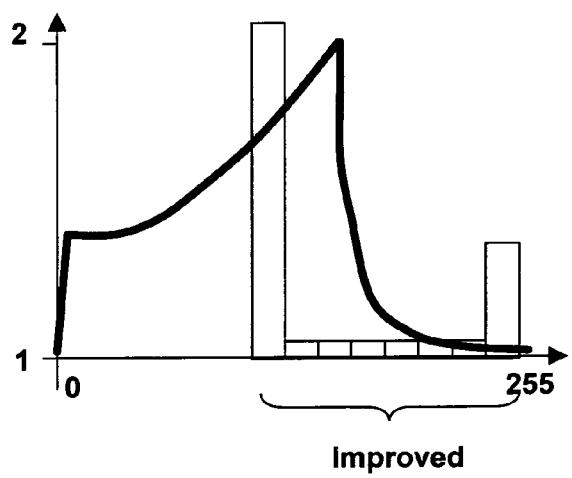
Improved

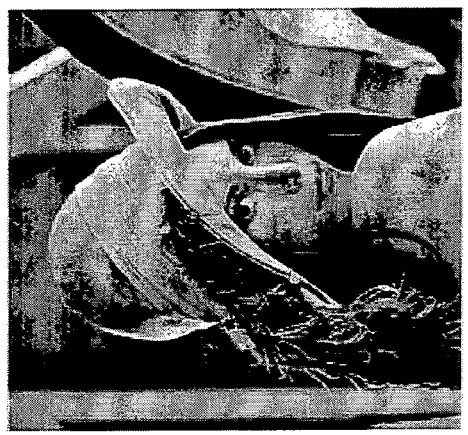
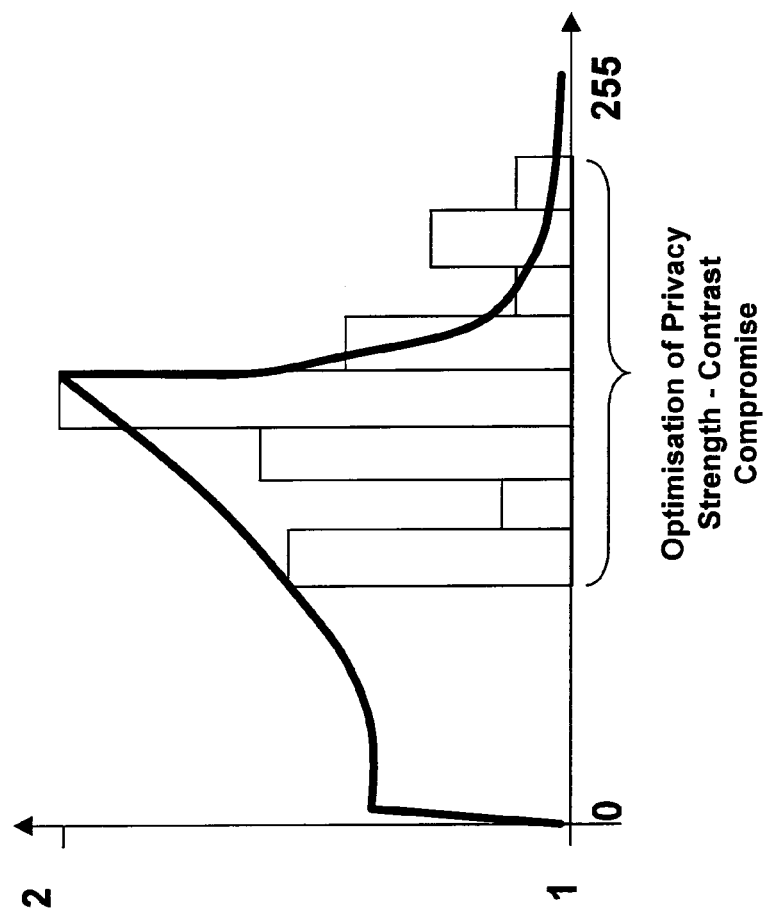
FIG. 22

METHOD, APPARATUS AND PROGRAM FOR PROCESSING IMAGE DATA FOR DISPLAY BY A DISPLAY PANEL OF A DISPLAY DEVICE, AND A DISPLAY DEVICE

TECHNICAL FIELD

The present invention relates to a method, apparatus and program for processing image data for display by a display panel of a display device, and a display device, such as an active matrix display device, which is operable in a private display mode.

BACKGROUND ART

In a first, public, mode of a display device that is switchable between a public and private display mode, the device commonly behaves as a standard display. A single image is displayed by the device to as wide a viewing angle range as possible, with optimum brightness, image contrast and resolution for all viewers. In the second, private mode, the main image is discernible only from within a reduced range of viewing angles, usually centred on the normal to the display surface. Viewers regarding the display from outside this reduced angular range will perceive either a second, masking image which obscures the main image, or a main image so degraded as to render it unintelligible.

This concept can be applied to many devices where a user may benefit from the option of a privacy function on their normally wide-view display, for use in certain public situations where privacy is desirable. Examples of such devices include mobile phones, Personal Digital Assistants (PDAs), laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in car television screen while the car is in motion.

Several methods exist for adding a light controlling apparatus to a naturally wide-viewing range display:

One such structure for controlling the direction of light is a 'louvred' film. The film consists of alternating transparent and opaque layers in an arrangement similar to a Venetian blind. Like a Venetian blind, it allows light to pass through it when the light is travelling in a direction nearly parallel to the layers, but absorbs light travelling at large angles to the plane of the layers. These layers may be perpendicular to the surface of the film or at some other angle. Methods for the production of such films are described in a USRE27617 (F.O. Olsen; 3M 1973), U.S. Pat. No. 4,766,023 (S.-L. Lu, 3M 1988), and U.S. Pat. No. 4,764,410 (R.F. Grzywinski; 3M 1988).

Other methods exist for making films with similar properties to the louvred film. These are described, for example, in U.S. Pat. No. 5,147,716 (P.A. Bellus; 3M 1992), and U.S. Pat. No. 5,528,319 (R. R. Austin; Photran Corp. 1996).

Louvre films may be placed either in front of a display panel or between a transmissive display and its backlight to restrict the range of angles from which the display can be viewed. In other words, they make a display "private".

The principal limitation of such films is that they require mechanical manipulation, i.e. removal of the film, to change the display between the public and private viewing modes:

In GB2413394 (Sharp, 2004), an electronically switchable privacy device is constructed by adding one or more extra liquid crystal layers and polarisers to a display panel. The intrinsic viewing angle dependence of these extra elements can be changed by switching the liquid crystal electrically in the well-known way. Devices utilising this technology include the Sharp Sh851i and Sh902i mobile phones.

The above methods suffer the disadvantage that they require the addition of extra apparatus to the display to provide the functionality of electrically switching the viewing angle range. This adds cost, and particularly bulk to the display, which is very undesirable, particularly in mobile display applications such as mobile phones and laptop computers.

Methods to control the viewing angle properties of an LCD by switching the single liquid crystal layer of the display between two different configurations, both of which are capable of displaying a high quality image to the on-axis viewer are described in U.S. 20070040780A1 (Sharp, 2005) and WO2009057417A1 (Sharp, 2007). These devices provide the switchable privacy function without the need for added display thickness, but require complex pixel electrode designs and other manufacturing modifications to a standard display.

An example of a display device with privacy mode capability with no added display hardware complexity is disclosed in WO 2009/069048 (published on Jun. 4, 2009).

Another such example is provided in U.S. 20090079674A1 (published on Mar. 26, 2009), which discloses a privacy mode for a display in which different levels of signal voltage are applied to adjacent pixels so that an averaged brightness of those pixels varies with the signal voltages according to the display's gamma curve to show an expected image when viewed on axis, and in which the averaged brightness is at a constant level within a specified voltage range when viewed off axis, so as to change a contrast of the image to a visibly unidentifiable degree off axis.

Another example of a display device with privacy mode capability with no added display hardware complexity is the Sharp Sh702iS mobile phone. This uses a manipulation of the image data displayed on the phone's LCD, in conjunction with the angular data-luminance properties inherent to the liquid crystal mode used in the display, to produce a private mode in which the displayed information is unintelligible to viewers observing the display from an off-centre position. However, the quality of the image displayed to the legitimate, on-axis viewer in the private mode is severely degraded.

Similar schemes to that used on the Sh702iS phone, but which manipulate the image data in a manner dependent on a second, masking, image, and therefore causes that masking image to be perceived by the off-axis viewer when the modified image is displayed, are given in GB2428152A1 (published on January 2007) and GB application GB0804022.2 (published as GB2457106A on Aug. 5, 2009). The method disclosed in the above publications uses the change in data value to luminance curve with viewing angle inherent in many liquid crystal display modes such as "Advanced Super View" (ASV) (IDW'02 Digest, pp 203-206) or Polymer Stabilised Alignment (PSA) (SID'04 Digest, pp 1200-1203).

The data values of the image displayed on the LC panel are altered in such a way that the modifications applied to neighbouring pixels effectively cancel out when viewed from the front of the display (on-axis), such that the main image is reproduced, but when viewed from an oblique (off-axis) angle, the modifications to neighbouring pixels result in a net luminance change, dependent on the degree of modification applied, so the perceived image may be altered.

It is desirable to provide improvements to the method described in GB2428152A1 and GB2457106A.

SUMMARY OF INVENTION

According to a first aspect of the present invention, there is provided a method of processing image data for display by a display panel of a display device, comprising: receiving main image pixel data representing a main image and side image pixel data representing a side image; performing a mapping of the pixel data to signals used to drive the display panel, wherein the mapping is arranged to produce an average on-axis luminance which is dependent mainly on the main image pixel data and an average off-axis luminance which is dependent at least to some extent on the side image pixel data; and performing a compression of the main image pixel data at least partly in dependence upon the main image pixel data and at least partly in dependence upon how the off-axis luminance varies with pixel data input to the mapping, where the compression is performed in advance of or at least partly incorporated into the mapping.

According to a second aspect of the present invention, there is provided an apparatus arranged to perform a method of processing image data for display by a display panel of a display device, the method comprising: receiving main image pixel data representing a main image and side image pixel data representing a side image; performing a mapping of the pixel data to signals used to drive the display panel, wherein the mapping is arranged to produce an average on-axis luminance which is dependent mainly on the main image pixel data and an average off-axis luminance which is dependent at least to some extent on the side image pixel data; and performing a compression of the main image pixel data at least partly in dependence upon the main image pixel data and at least partly in dependence upon how the off-axis luminance varies with pixel data input to the mapping, where the compression is performed in advance of or at least partly incorporated into the mapping.

According to a third aspect of the present invention, there is provided a display device comprising an apparatus according to the second aspect of the present invention.

According to a fourth aspect of the present invention there is provided a program for controlling an apparatus to perform a method according to the first aspect of the present invention or which, when loaded into an apparatus, causes the apparatus to become an apparatus or device according to the second or third aspect of the present invention. The program may be carried on a carrier medium. The carrier medium may be a storage medium. The carrier medium may be a transmission medium.

According to a fifth aspect of the present invention there is provided an apparatus programmed by a program according to the fourth aspect of the present invention.

According to a sixth aspect of the present invention there is provided a storage medium containing a program according to the fourth aspect of the present invention.

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 7: shows the maximum side-image contrast ratio as a function of main image data value, with the superimposed pixel data histogram of an example main image compressed into the standard range.

FIG. 8: shows the maximum side-image contrast ratio as a function of main image data value, with the superimposed pixel data histogram of an example main image compressed into the standard range.

FIG. 11: shows example pre-calculated tables of coefficients for modifying an 8 bin image histogram as may be used in an embodiment of the invention.

FIG. 13: shows the maximum side-image contrast ratio as a function of main image data value, with the superimposed pixel data histogram of an example main image compressed according to the method of the preferred embodiment.

FIG. 20: provides a histogram-related comparison between a previously-considered scheme for compressing a main image in a privacy/multiview method with a scheme for a compressing the main image according to an embodiment of the present invention.

FIG. 21: provides a histogram-related comparison between a previously-considered scheme for compressing a main image in a privacy/multiview method with a scheme for a compressing the main image according to an embodiment of the present invention.

FIG. 22: provides an illustration of the histogram resulting from a compression carried out according to an embodiment of the present invention.

DESCRIPTION OF EMBODIMENTS

Figure 1:
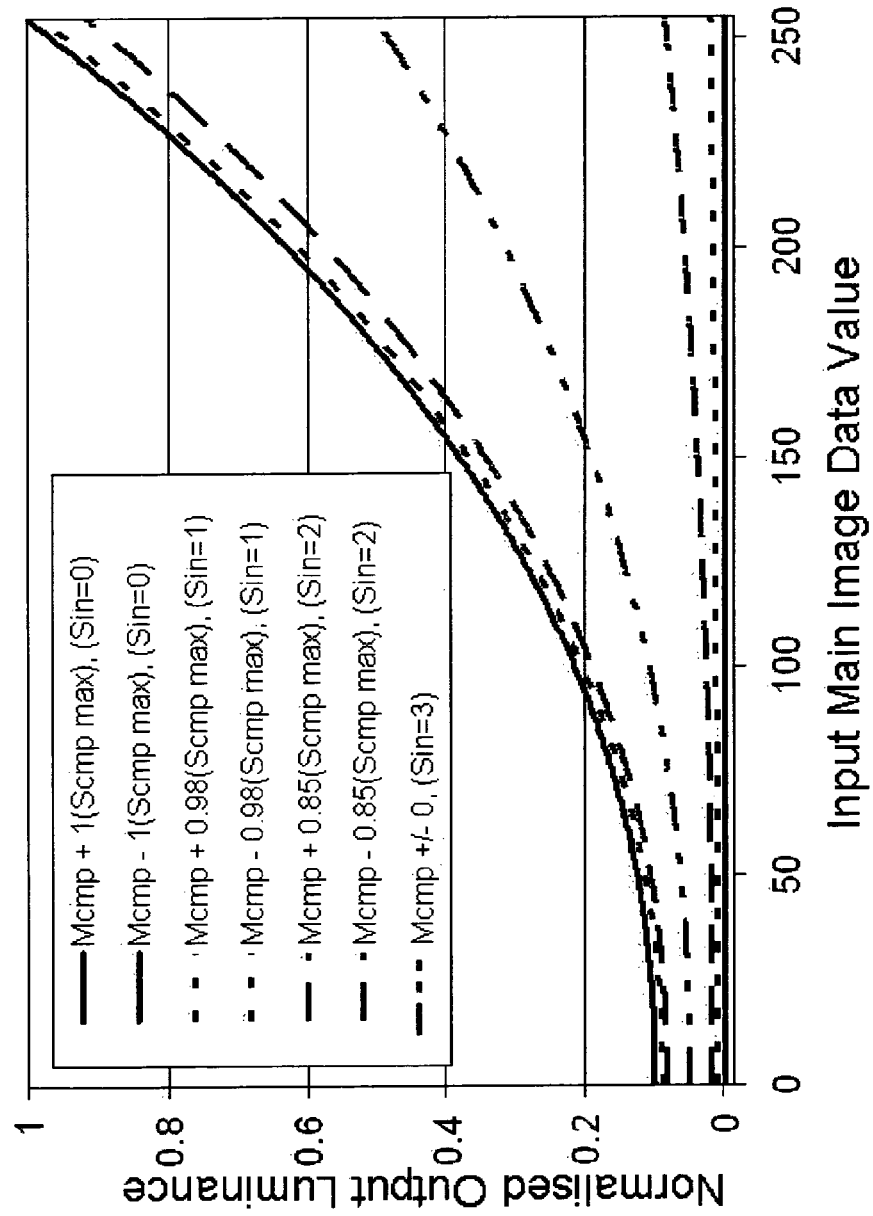
FIG. 1: is graphical representation of a previously-considered input-output data mapping used to produce a multiview effect on a liquid crystal display.

In the method described in GB2428152A1 and GB2457106A, when in the private mode the image displayed to the on-axis viewer is compressed so as to have a reduced maximum brightness and contrast ratio, in order to allow the image data values to be modified in either direction by at least a minimum amount. This ensures that whatever the main image content, there is sufficient scope for altering the brightness of each image region observed by the off-axis viewer to create a visible side image.

A set compression range for the main image in the private mode is suggested in GB2428152A1 and GB2457106A, e.g. re-setting the image to have values only between 5% and 50% of the available display luminance range, regardless of either the main image or the side image content. This ensures that a satisfactory privacy effect is obtained for all types of main and side image content, but it does not enable the compression range to be optimised according to the main and side image content.

The present applicant has appreciated that it is desirable to provide a privacy display of the type outlined in GB2428152A1 and GB2457106A, which also incorporates a means of determining the optimum compression range for the main image, according to the main and side image content being displayed at any given time, in order to optimally provide satisfactory side image appearance while maintaining as much of the main image quality (contrast, brightness etc) as possible.

An embodiment of the present invention provides a means of analysing the main image, and if necessary also the side image, content of a switchable privacy display operating in the private mode, for each frame or several frames of the images being displayed, so as to determine the optimal compression parameters to produce a satisfactory side image appearance while retaining as much of the main image quality as possible.

It also provides a switchable viewing angle, multiview or switchable privacy display containing such a means for use when operated in the private/multiview mode. In the public mode, the display would operate in a substantially unaltered manner from a standard LCD, in that for each frame of the video displayed, data constituting a single image is supplied to the display control electronics, the control electronics then output a series of signal voltages and timing signals to the active-matrix array of the display, and these voltages reorient the liquid crystal director within each pixel in such a way that the required amount of light is transmitted by each pixel through the display polarisers to cause the image to be displayed.

In the private mode, the display controller outputs signal voltages which are dependent on two input images, the main image for observation by the legitimate viewer on-axis, and a side image for observation by viewers not positioned in front of the display. It should be noted that the display controller still outputs the same quantity of signal voltage information (a voltage for each pixel in the display) as in the public mode. It is simply that those output voltages are now dependent on the image data values of two, rather than one, input images.

An embodiment of the present invention provides a means of calculating modifications to the main image output signal voltages such that, due to an averaged effect of the modifications being perceived, the main image is still observed by the on-axis viewer while, due to the data value to luminance response of the display differing on and off axis to cause the averaged effect of the modifications to alter, the side image is seen by the off-axis viewer.

An embodiment of the present invention provides a means of analysing the main and side image content to be displayed at any given time, and determining from these the optimum compression parameters to be applied to the main image in order to allow the averaging modification described above to produce a satisfactory side image appearance, while retaining as much of the original quality of the main image as possible. It also continues an LCD display with control electronics modified from the standard to incorporate such an analysis and parameter determination means for use when in the private mode.

An embodiment of the present invention is based closely on the display device as set out in GB2457106A. The display device of GB2457106A will not be described in detail herein, and instead the entire content of GB2457106A is considered to be incorporated herein. Any differences between an embodiment of the present invention and the disclosure of GB2457106A will be highlighted below; the main difference is in utilising an additional means of determining the optimum parameters for compression of the main image.

Figure 19:
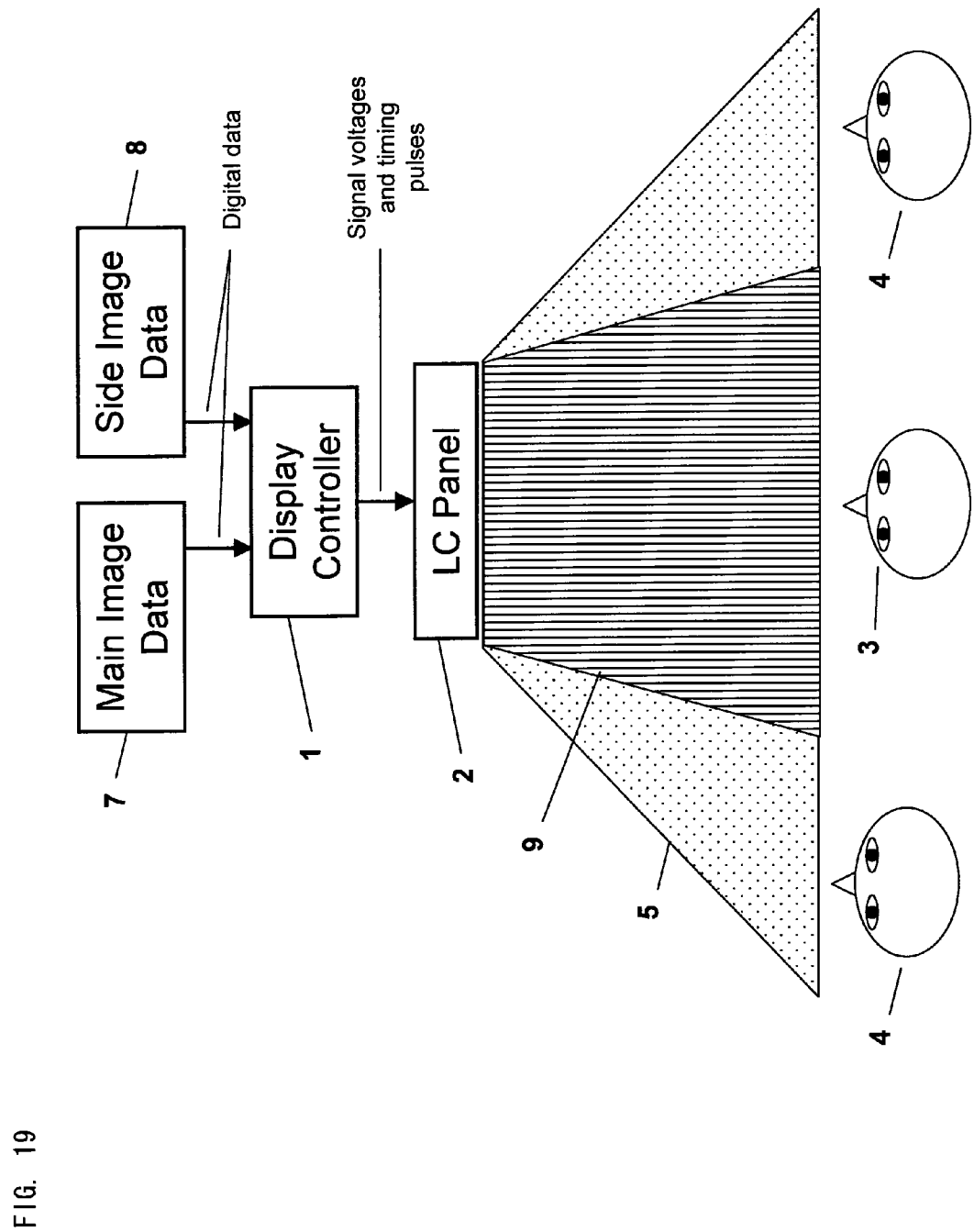
FIG. 19: is a schematic of a display described in GB2457106A, and upon which an embodiment of the present invention is based, when operating in the private mode.

FIG. 19 illustrates a display device as described in GB2457106A and upon which an embodiment of the present invention is based. A display device is provided that comprises a liquid crystal display panel 2 for displaying an image by spatial light modulation. When the device is operating in the private mode, two image datasets are input to a display controller 1 in every frame period: main image data 7 constituting a main image, and side image data 8 constituting a side image. The display controller 1 then outputs a set of signal data voltages, one data voltage for each pixel in the LC panel. The display controller 1 utilises an expanded look-up table (LUT) and the output signal data voltage for each pixel in the LC panel, constituting a combined image, is dependent on the data values for the corresponding pixel (in terms of spatial position in the image) in both the main 7 and side 8 images. The output data voltage for each pixel may also be dependent on a third, spatially dependent, parameter determined by the spatial position of the pixel within the display. The signal voltages from the display controller 1 cause the LC panel 2 to display a combined image to a wide cone 5 of angles. The image observed by the main viewer 3 is recognisably the main image, with minimal degradation of the main image quality. However, due to the different gamma curve characteristic of the LC panel for the off-axis viewers 4, these off-axis observers perceive the side image most prominently, which obscures and/or degrades the main image, securing the main image information to viewers within a restricted cone 9 of angles centred on the display normal.

In GB2457106A, the relationship between the input and output image data values is determined as follows:

In a first step, both the main and secondary images have their pixel data values converted to equivalent luminance values, $M_{Lum}(x, y, c) = M_{in}(x, y, c)^\gamma$, $S_{Lum}(x, y, c) = S_{in}(x, y, c)^\gamma$, where $M_{in}$ and $S_{in}$ are normalised to have values between zero and one, and $\gamma$ is the exponent relating the data value to luminance of the display, known as the display gamma and typically having a value of 2.2.

In a second step, these luminance values of the main image are then compressed by a factor $\beta$ and raised by an offset factor $\partial$: $M_{cmp}(x, y, c) = \beta \cdot M_{Lum}(x, y, c) + \partial$. It is the calculation of optimised values of these compression parameters which is where an embodiment of the present invention differs from GB2457106A, and this is discussed in further detail below.

Each pixel luminance value in the side image is then scaled by a factor equal to the difference between the luminance value of the corresponding pixel in the compressed main image and the edge of the range (0 or 1, whichever is closer). This difference can be obtained for any luminance value from the r.m.s. of the difference between the value and the centre of the range. Therefore the side image luminance values are scaled as $S_{cmp}(x, y, c) = S_{Lum}(x, y, c) \cdot (0.5 - \sqrt{(M_{cmp}(x,y,c) - 0.5)^2})$. A minimum value greater than zero may be specified for the transformed equivalent luminance value for the side data value.

In the above, $\sqrt{(M_{cmp(x,y,c)} - 0.5)^2}$ is equivalent to $|M_{cmp}(x, y, c) - 0.5|$, which is the absolute amount by which $M_{cmp}(x, y, c)$ differs from 0.5.

In a third step, the compressed main and side images are combined, now with the addition/subtraction of luminance patterned on a sub-pixel level, for example using the spatially-varying parameter referred to previously. Colour sub-pixels are grouped into pairs with one pixel in each having its output luminance equal to the sum of the compressed main and side image luminances at that pixel, and the other having an output luminance equal to the compressed main image luminance minus the compressed side image luminance. Therefore, for the maximum value of $S_{Lum}$, one of the pair is always modified so as to take it either to the maximum or to the minimum of the normalized range (whichever is closer), with the other of the pair being modified in the opposite direction. The amount of such splitting, for a particular value of $M_{in}$, is determined by the value of SLum.

As there are three colour sub-pixels in each white pixel, in order to retain the overall colour balance of the output image, the colour sub-pixels which have luminance added in the output image and those which have luminance subtracted are alternated every white pixel. This is done in both the x and y directions. It is found that this results in the optimum quality of the output image, as perceived by the on-axis viewer. The repeating unit in the pattern of combination of this method is therefore a 2×2 block of white pixels, each colour sub-pixel of which has luminance as follows:

$$C(x,y,R) = M_{cmp}(x,y,R) + S_{cmp}(x,y,R),$$

$$C(x,y,G) = M_{cmp}(x,y,G) - S_{cmp}(x,y,G)$$

$$C(x,y,B) = M_{cmp}(x,y,B) + S_{cmp}(x,y,B)$$

$$C(x+1,y,R) = M_{cmp}(x+1,y,R) - S_{cmp}(x+1,y,R)$$

$$C(x+1,y,G) = M_{cmp}(x+1,y,G) + S_{cmp}(x+1,y,G)$$

$$C(x+1,y,B) = M_{cmp}(x+1,y,B) - S_{cmp}(x+1,y,B)$$

$$C(x,y+1,R) = M_{cmp}(x,y+1,R) - S_{cmp}(x,y+1,R)$$

$$C(x,y+1,G) = M_{cmp}(x,y+1,G) + S_{cmp}(x,y+1,G)$$

$$C(x,y+1,B) = M_{cmp}(x,y+1,B) - S_{cmp}(x,y+1,B)$$

$$C(x+1,y+1,R) = M_{cmp}(x+1,y+1,R) + S_{cmp}(x+1,y+1,R)$$

$$C(x+1,y+1,G) = M_{cmp}(x+1,y+1,G) - S_{cmp}(x+1,y+1,G)$$

$$C(x+1,y+1,B) = M_{cmp}(x+1,y+1,B) + S_{cmp}(x+1,y+1,B)$$

The equivalent image data level for the combined image can be found by applying the inverse of the gamma power operation: $C_{data}(x, y, c) = C(x, y, c)^{1/\gamma}$. The output voltage in the expanded LUT of the display control electronics will then be equal to the voltage corresponding to this equivalent data level in the public mode off LUT entries.

PCT/JP2008/068324 (published as WO 2009/110128 on Sep. 11, 2009), which is based on GB2457106A, also discloses a method to obtain an accurate colour side image effect, in which the side image of 2 bit per colour (6 bit total) depth is input to the control electronics, and four pairs of output values are include din the expanded LUT for every main image data value, the output value pairs being calculated according to the following method:

$$C(x,y,c) = M_{cmp}(x,y,c) \pm 1 \times S_{cmpmax}(x,y,c), \text{ for } S_{in}=0$$

$$C(x,y,c) = M_{cmp}(x,y,c) \pm 0.98 \times S_{cmpmax}(x,y,c), \text{ for } S_{in}=1$$

$$C(x,y,c) = M_{cmp}(x,y,c) \pm 0.85 \times S_{cmpmax}(x,y,c), \text{ for } S_{in}=2$$

$$C(x,y,c) = M_{cmp}(x,y,c) \pm 0, \text{ for } S_{in}=3$$

where "$S_{cmp\ max}$" is the maximum available compressed side image value, calculated as previously, i.e. for $S_{cmp\ max} = |M_{cmp}(x, y, c) - 0.5|$. The graphical representation of values calculated in this way is shown in FIG. 1.

Figure 2:
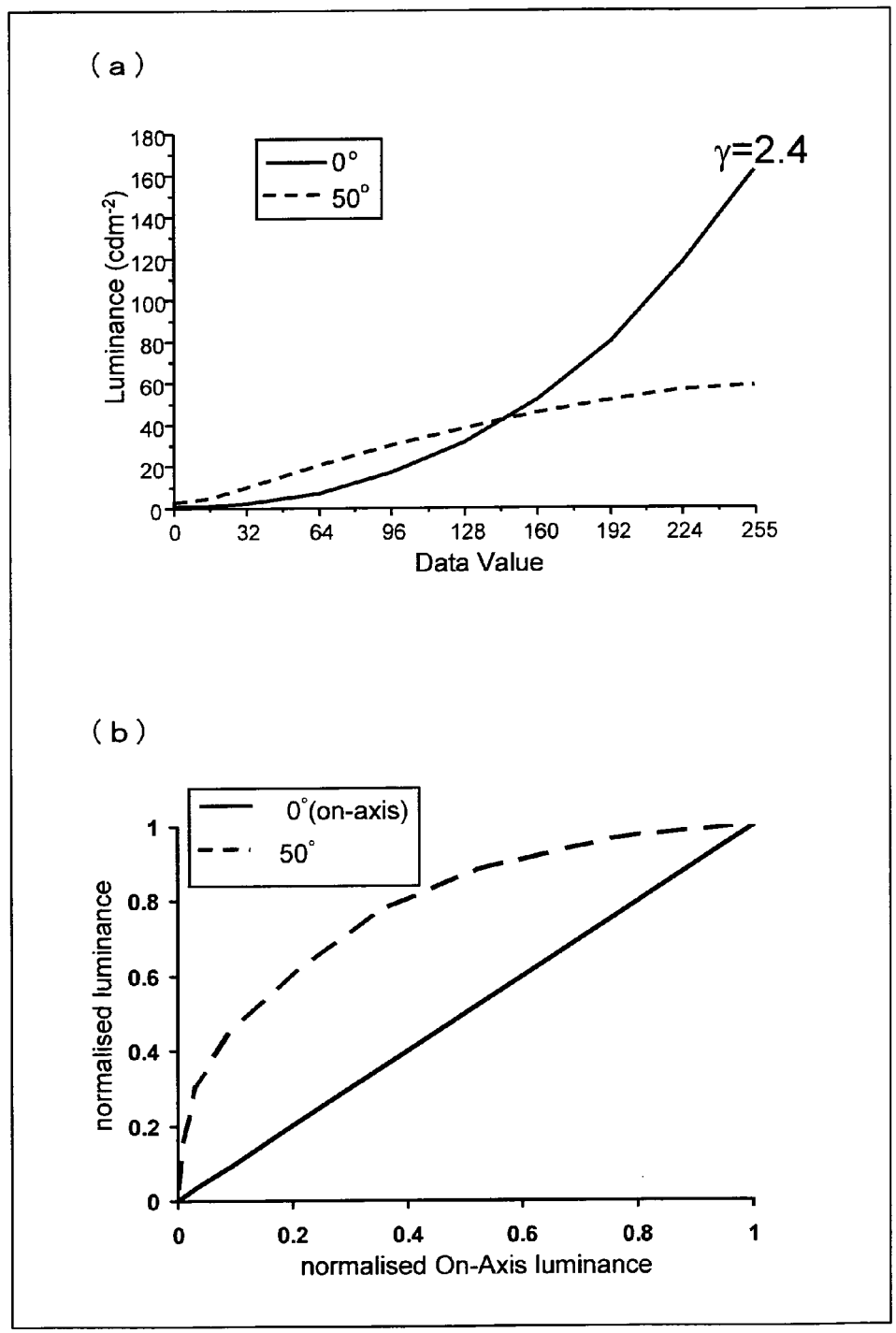
FIG. 2: is a pair of graphs showing (a) the on-axis and off-axis data value to luminance response (e.g. gamma curve) and (b) the normalised off-axis to on-axis luminance curve for a typical VAN type LCD.
Figure 3:
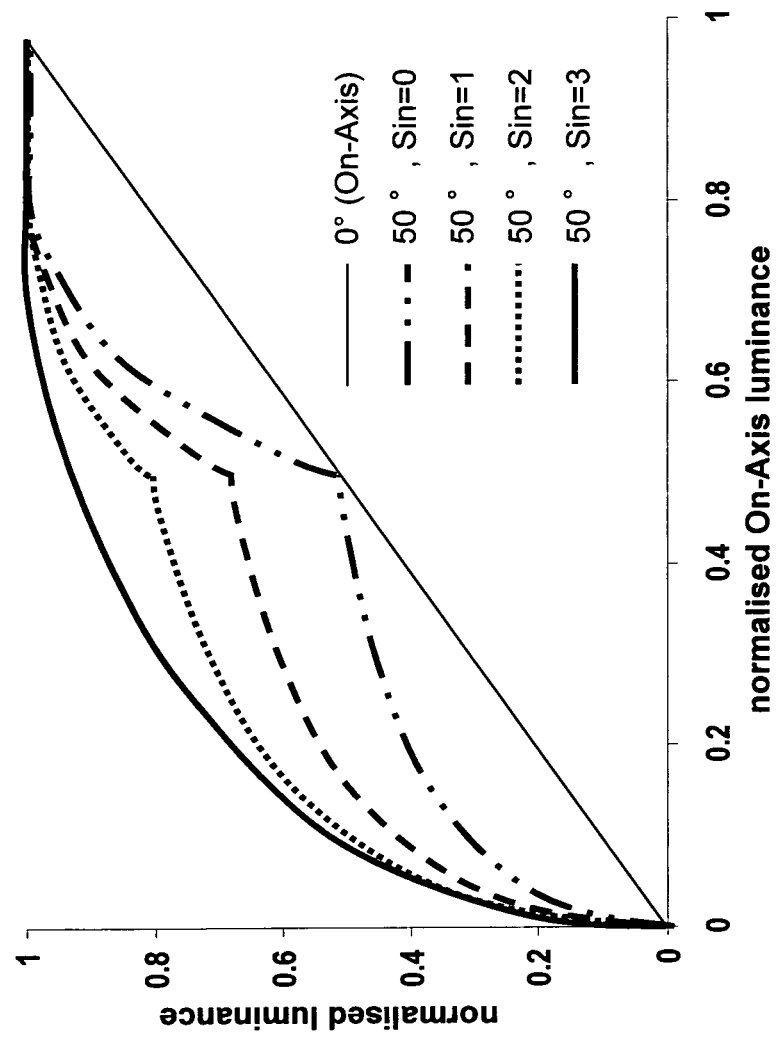
FIG. 3: is graph showing the multiple normalised off-axis to on-axis luminance curves provides by a mapping of the type in FIG. 1.

FIG. 2(*a*) shows a typical data value to luminance response (gamma curve), on-axis and at a viewing inclination of 50° off-axis, for an MVA or ASV type display. If these data values are normalized and plotted against the normalised On-Axis luminance, the result is as shown in FIG. 2(*b*). When the above method is applied to a display with this characteristic, the resulting off-axis luminance as a function of on-axis luminance for each side image value is shown in FIG. 3. Note the full range of available On-Axis luminance values is shown in FIG. 3, as would be attainable with no main image compression ($\beta=1$, $\partial=0$).

Figure 4:
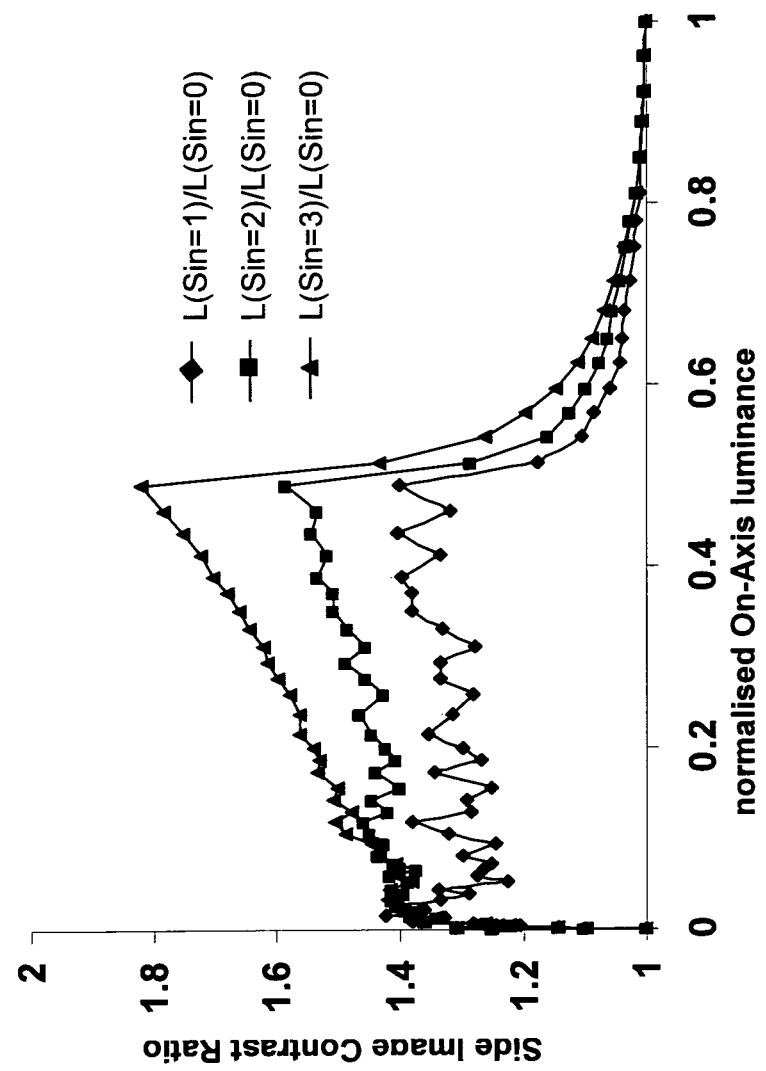
FIG. 4: is a graph showing the off-axis contrast ratios as a function of on-axis luminance for the curves of FIG. 3.

The above previously-considered method of calculation has four possible side image values: $S_{in}=0$, 1, 2 and 3. As can be seen in FIG. 3, when $S_{in}=0$, maximum splitting is used for each main image data value, resulting in the lowest overall luminance off-axis across the range of on-axis luminances. When $S_{in}=3$, no splitting is used, resulting in the highest overall luminance off-axis across the range of on-axis luminances. The suggested values of 0.98 and 0.85 times the maximum available change to the $M_{cmp}$ data for the mid-range side image values $S_{in}=1$ and 2 respectively has been found to produce approximately even increments in the off-axis luminance for the different input side image values. This means the different side image states retain a good degree of proportionality relative to each other over the whole on-axis luminance range. This is further illustrated in FIG. 4 which shows the relative luminance of the different side image states at 50° viewing inclination as a function of on-axis luminance as measured on an ASV type LCD operating in the manner described above. In other words, FIG. 4 shows the off axis luminance curves from FIG. 3 for $S_{in}=3$, 2 and 1, divided by the off-axis luminance curve for $S_{in}=0$ from FIG. 3, i.e. the contrast ratio of the different side image states, over all on-axis luminances. It shows that for most of the on-axis luminance range, regions where $S_{in}=1$ will be roughly 1.3× brighter than those with $S_{in}=0$, and regions with $S_{in}=2$ will be roughly 1.5× brighter than those with $S_{in}=0$, and regions with $S_{in}=3$ will be as bright as possible (up to 1.8× brighter than those with $S_{in}=0$). As can be seen from FIG. 4, the contrast ratio of the side image, defined as the luminance ratio as observed by an off-axis viewer of a region of the side image with input value $S_{in}=3$ to a region with $S_{in}=0$, is dependent on the main image value for those regions. If the main image is black or white, there is effectively no room within the data range to modify the data values of two neighbouring pixels in opposite directions so that their average luminance remains the same, and the perceived brightness of the pixels to the on-axis viewer does not change. One of the pixels will reach the edge of the range, limiting the change that can be applied to both.

The side image therefore has low contrast for high and low main image data values.

Figure 5:
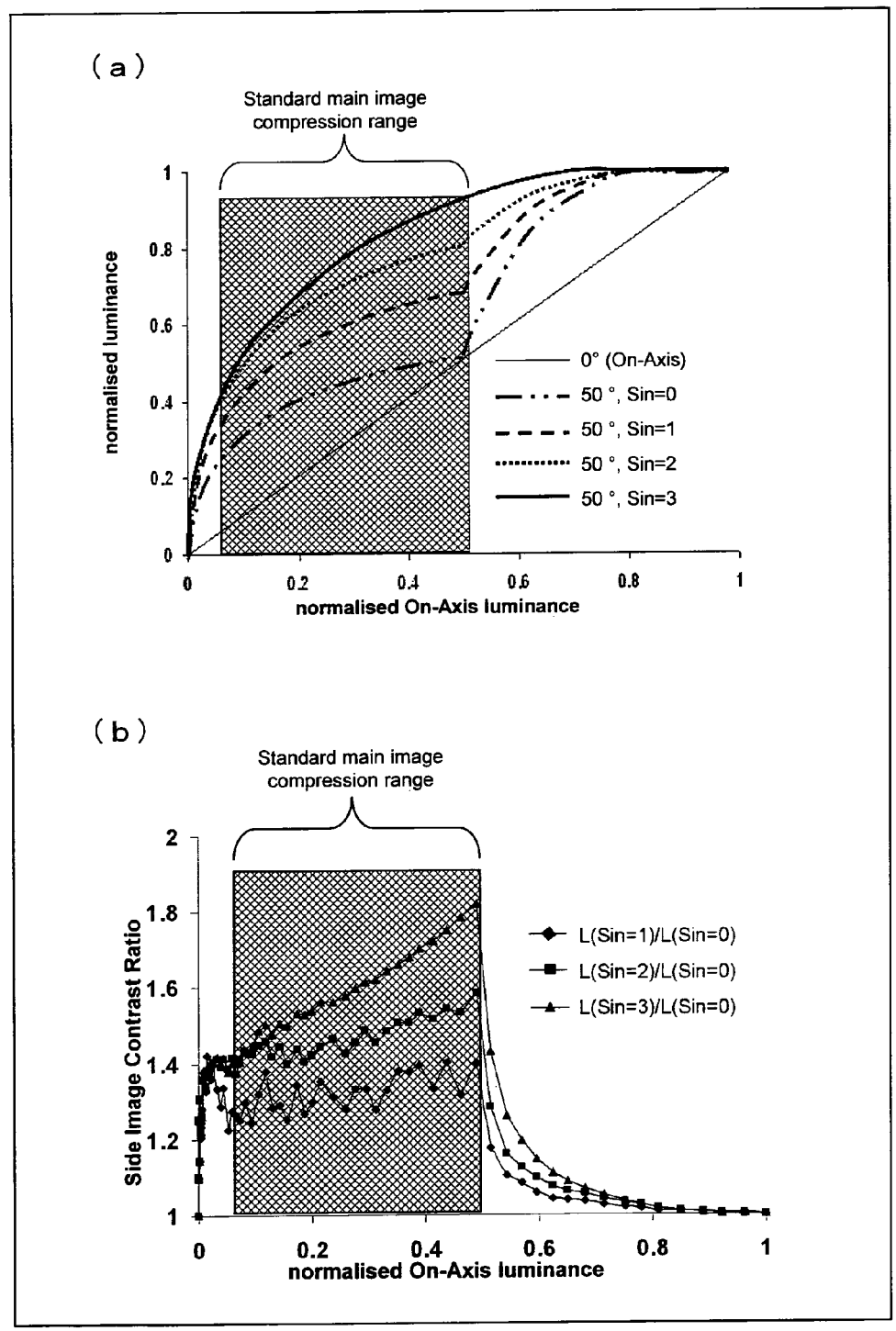
FIG. 5: shows the graphs of FIGS. 3 and 4 with the range into which the main image is typically compressed shaded, at least in the previously-considered method.

The side image has highest contrast for regions of the main image with data values which produce a luminance to the on-axis viewer of approximately 50% of the maximum (data values near 190 out of 255 for display with a typical gamma value of 2.2), as it is these regions which can have the largest zero net luminance change modifications applied to neighbouring pixels. It is therefore advantageous for reproduction of the side image to the off-axis viewer if the main image consist mostly of data values corresponding to high side image contrast availability. For this reason the previously-considered method used compression parameters of $\beta=0.45$ and $\delta=0.05$, so that input main image regions with data=255/255 were compressed to have 50% of maximum luminance (data approximately 190/255). In this way, optimum side image reproduction, and therefore strong privacy is achieved for mostly white main images, such as black text on a white background, which is the typical content for key privacy applications on mobile displays such as composing and reading emails, text messages and documents. FIGS. 5(a) and (b) shows the plots of FIGS. 3 and 4 with the range of main image luminance values after the standard compression as described superimposed as the shaded region. This illustrates how the brighter edge of the shaded region coincides with the point of maximum side image contrast.

The previously-considered method however has the drawback that due to the compression parameters for the main image being fixed, and therefore having to provide a degree of compression which allows a satisfactory side image to be reproduced for any main image content, the compression is sometimes more than required to allow satisfactory reproduction of the side image for some main image content. In this event, the quality (brightness and contrast) of the main image has been reduced more than necessary. It is also the case that in order to retain satisfactory main image quality after the standard fixed compression process, reduced side image reproduction quality is accepted for some types of main image (e.g. main images which are mostly black, and therefore have large areas where the side image contrast is only 1.4 according to FIG. 5(b)).

Figure 6:
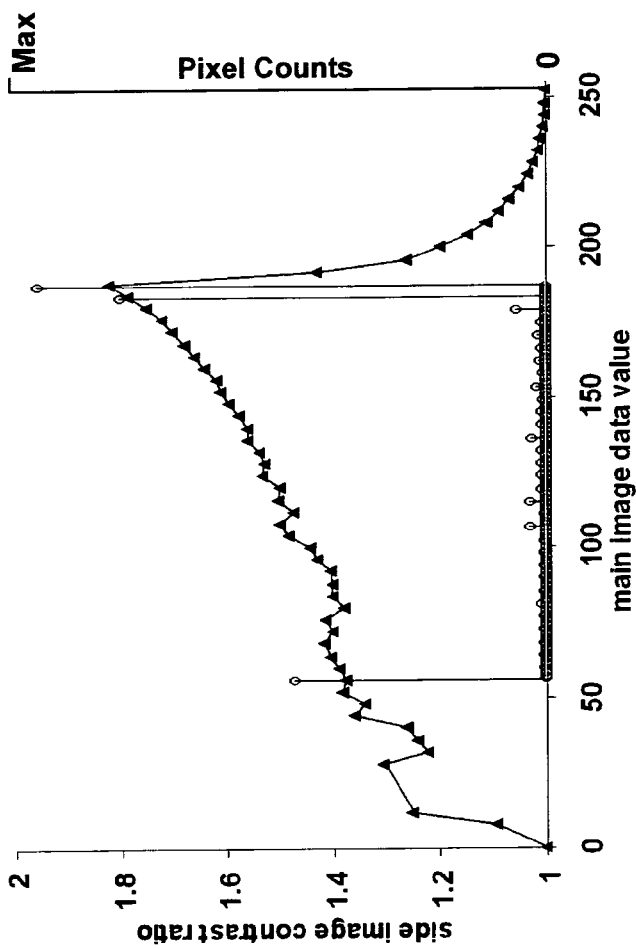
FIG. 6: shows the maximum side-image contrast ratio as a function of main image data value, with the superimposed pixel data histogram of an example main image compressed into the standard range.

These effects are illustrated in FIGS. 6 to 8. Each of these figures show the maximum side image contrast function of FIG. 4, plotted against main image data value rather than luminance in this case, with the pixel data histogram after compression with the standard parameters superimposed. This allows easy visualisation of the side image contrast available to the main image regions with the most common data values and is therefore a good guide to how effective the privacy effect will be for a particular main image.

FIG. 6 shows that for a mostly white image such as typical black text on a white background web browser content (pictured next to the graph), the standard compression parameters work well, aligning the largest peak of the image histogram with the point of maximum side image contrast. It is still the case though that, as black pixels are relatively few in number and therefore have little effect on the overall side image appearance, the effect of the standard δ parameter value of 0.05 to raise the data level of the black pixels from 0 to approximately 60 is unnecessary, and better main image contrast would have been achieved by leaving these pixels with a value of 0 for no significant cost to the side image appearance.

FIG. 7 shows the same plot for the inverse image, which now has white text on a black background (also pictured). In this case, the standard compression results in the majority of the area of the image having low side image contrast, so the privacy effect will be weak.

FIG. 8 shows the same plot for an example picture image. In this case, the image before compression had a large number of pixels near the 50% luminance value allowing maximum side image contrast, but the compression process has moved these towards the darker end of the data range, both degrading the main image quality and reducing the overall side image contrast availability.

Figure 9:
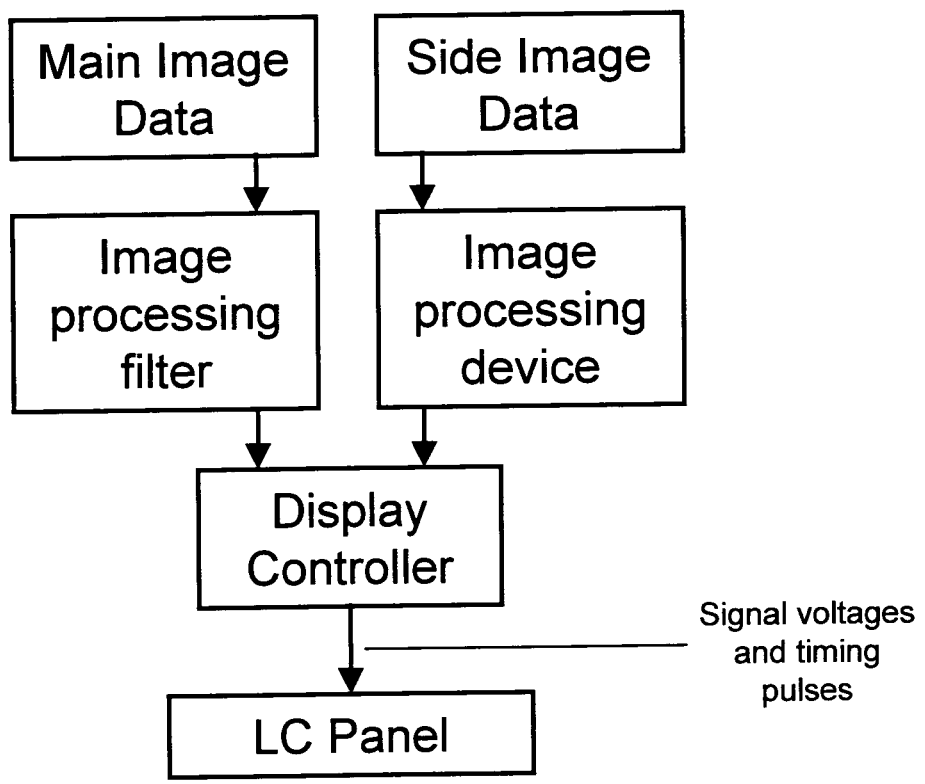
FIG. 9: is a process flow diagram showing illustrating a previously-considered multiview image processing function.
Figure 10:
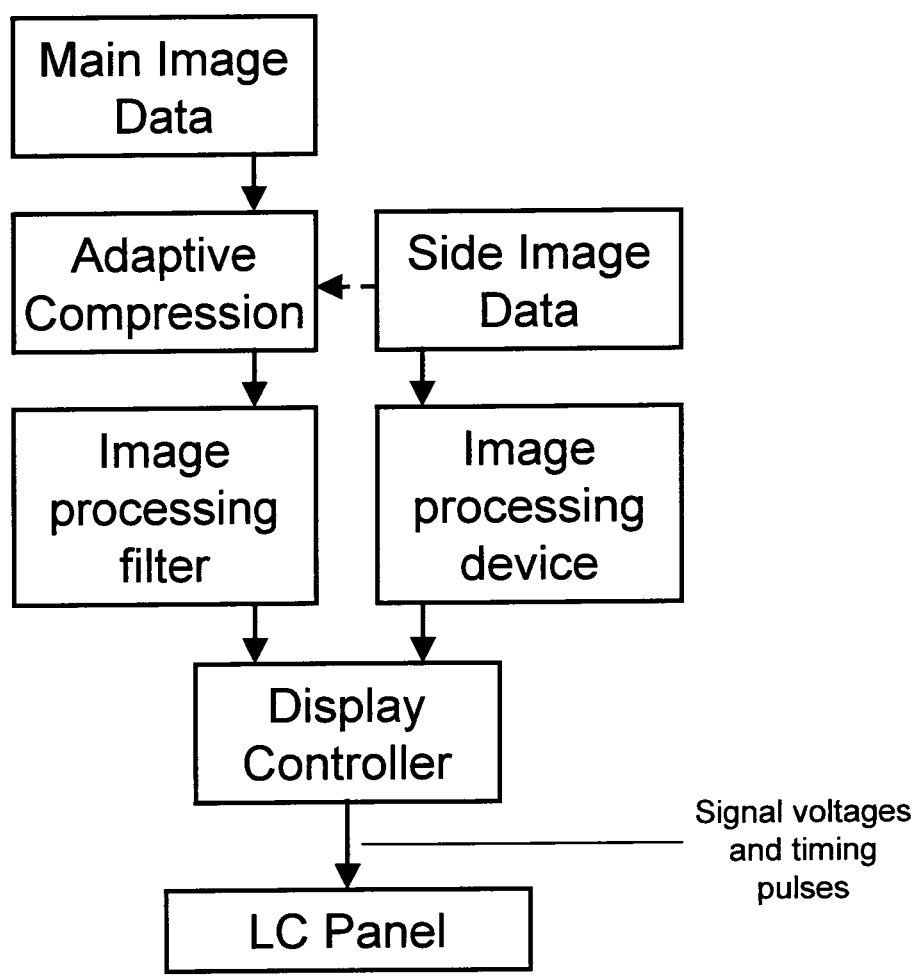
FIG. 10: shows the process flow diagram of FIG. 9 modified according to this invention.

In a preferred embodiment of this invention, an extra adaptive main image compression step is included in the process flow of the existing software only privacy display control electronics. The process flow of a method disclosed in GB application GB0819179.3 (published as GB2464521A on April 2010) is shown in FIG. 9. This flow already contains an "image processing filter" step in which main image features which may result in colour artefact problems are detected and altered before the main image data are input to the modified display controller. The adaptive main image compression step may be inserted anywhere between the initial main image data input step and the modified main image being input to the display controller within which the main and side image data are combined to produce the multiview or privacy image effect, when the device is operating in the private mode, i.e. either before the image filtering step, as shown in FIG. 10, or after, or even instead of the image filtering step if no image filtering step is included. (The dashed-line arrow in FIG. 10 is applicable to the embodiment described below with reference to FIGS. 16 to 18.)

In a method embodying the present invention, image data is processed for display by a display panel of a display device. Main image pixel data is received that represent a main image and side image pixel data is received that represent a side image. As in the previously-disclosed method, a mapping is performed of the pixel data to signals used to drive the display panel, wherein the mapping is arranged to produce an average on-axis luminance which is dependent mainly on the main image pixel data and an average off-axis luminance which is dependent at least to some extent on the side image pixel data (i.e. privacy mode). However, in addition to the above mapping, a compression of the main image pixel data is performed, the compression being performed at least partly in dependence upon the main image pixel data and at least partly in dependence upon how the off-axis luminance varies with pixel data input to the mapping. The compression is performed in advance of or at least partly incorporated into the mapping.

Further, it may be considered that the mapping is one which produces an average off-axis luminance which is dependent on the side image pixel data with at least some dependence on the main image pixel data such that a measure of the range of possible off-axis luminances, produced by changes in the side image pixel data, varies with main image pixel data. This is apparent, for example, from FIG. 3, in which, even for a constant side image value, the off-axis luminance clearly varies strongly in dependence on the main image pixel data (which itself gives rise to the on-axis luminance response). One possible measure of the range of possible off-axis luminances relates to a ratio of the highest available off-axis luminance to the lowest available luminance (refer to the contrast ratio shown in and described with reference to FIG. 4).

The main image pixel data may be compressed such that all of, or at least a predetermined proportion of, the main image pixel data are compressed into a certain range of on-axis luminances, with the range being determined at least partly by the main image pixel data. The range may be determined so that the above-referenced "measure" is above a predetermined level and/or exhibits a variation below a predetermined level across the range. The main image pixel data may be compressed so as to tend to place more main image pixel data where the range of possible off-axis luminances is greater. Each of at least some the main image pixel data may be weighted by a value determined in dependence upon the measure corresponding to the main image pixel data, and the main image pixel data may be compressed so as to tend to optimise (for example, maximise) a sum of the weighted values. A lower limit may be placed on the spread of the compressed main image pixel data, in order to preserve on axis contrast.

In a preferred embodiment, the compression comprises performing an iterative process, where the iterative process is guided by a predetermined measure of side image quality. A plurality of compressions may be trialled iteratively, substantially in order of increasing main image degradation, until the predetermined measure of side image quality reaches a predetermined threshold. A single compression of the main image pixel data may be carried out based upon the trial compressions. Each trial compression may comprise performing an actual compression of the main image pixel data. The predetermined measure of side image quality may relate to the sum of the weighted values described above. The predetermined measure of side image quality may be balanced against a measure of main image degradation.

In a preferred embodiment of the present invention, the main image pixel data are also grouped into a plurality of data value or luminance ranges fewer than the number of data value levels available for the main image pixel data, and the compression is performed based on the main image pixel data groupings rather than on individual pixel data values.

Such an embodiment, being based on an iterative process and using pixel data groupings, will now be described.

In the preferred embodiment, the adaptive main image compression step may consist of several sub-steps. In a first sub-step, the pixel data histogram of the main image, H, may be obtained. This histogram may be of any resolution, but the ease of implementation may have data values grouped into bins, $h_1$ to $h_n$, covering a given data range each. For an 8 bit per colour channel display, 8 bins of 32 data value width each may provide sufficient resolution in the histogram for improved compression parameters to be produced. As well as the data level bin resolution, the count value in each bin of the histogram may be of limited bit-depth, e.g. normalised and/or rounded to the nearest integer value. The histogram may be calculated taking into account all colour sub-pixels of the display, or by counting only one of the colour channels, e.g. the green channel in a RGB display only due to it contributing more significantly to the overall luminance of each pixel than the other channels, to reduce the computational complexity. The histogram may be calculated according to overall pixel luminance, with weighted contributions from the individual colour channels, or using conversion from RGB data to another colour space such as YCbCr. These options may also apply in the instance of the invention being utilised in a multiprimary display (that is a display containing sub-pixels with one or more colours in addition to the conventional red, green and blue colours; an example being a display with red, green, blue and white or yellow sub-pixels).

In a second sub-step, a modified histogram, H' may be calculated according to a test set of compression parameters.

It may be advantageous to calculate the modified histogram, H', from the histogram of the uncompressed main image, H, rather than applying the test compression to the actual main image data and re-calculating the histogram from that, due to the requirement for less memory and processing power. For example, the histogram may be recalculated according to how the bin counts would change if the main image had been subject to a scaling ($\beta$) value of an amount just sufficient to empty the top c bins of pixel counts, i.e. the maximum data value in the image reduced from 255 to 255−(c×32) in the example of an 8 bin histogram being used. If the histogram of the input main image is of reduced resolution, i.e. fewer than 1 bin per image data level, then the modified histogram calculation must assume that the pixel counts for each bin are evenly distributed though the data levels contained within that bin, or another similar assumption, in order to recalculate the histogram. Any inaccuracy arising from this assumption is likely to be insignificant in the result of the adaptive compression process however, and may be preferable to the increased computing resource required to avoid such an assumption. If such an assumption is made, the recalculation of the histogram according to the test compression is a simple arithmetic process, the results of which may be stored in a Look-Up Table (LUT) to save the process having to calculate these each time.

FIG. 11 shows an example of such tables of these modifications, for an 8 bin histogram based process and "c" values of 1 to 7 (shown as "Comp" in FIG. 11). The values of these tables provide the coefficients by which the counts of each bin in the initial histogram are multiplied to provide the counts of each bin in the modified histogram. For example, for the Comp=1 table of the figure, which provides the modified histogram in the case that the top c=1 bins are required to be empty, the counts of the bins in the modified histogram are given as:

$$h_1'=h_1+0.14*h_2$$

$$h_2'=0.86*h_2+0.29*h_3$$

$$h_3'=0.71*h_3+0.43*h_4$$

$$h_4'=0.57*h_4+0.57*h_5$$

$$h_5'=0.43*h_5+0.71*h_6$$

$h_6' = 0.29*h_6 + 0.86*h_7$ $h_7' = 0.14*h_7 + h_8$ $h_8' = 0$

In the above, $h_n$ is the current count for bin n, while $h_n'$ is the new count for bin n. For example, the new count for bin 3 is obtained by reading across the "Bin 3" row of the table to find a coefficient of 0.71 in the "Bin 3" column and a coefficient of 0.43 in the "Bin 4" column, so that $h_3' = 0.71*h_3 + 0.43*h_4$.

Of course, similar tables of coefficients may be calculated and stored in the process hardware for the same process based on a main image histogram with any number of bins.

In a third sub-step, a further modified histogram, H", may be calculated according to how the bin counts would change if the main image had been subject to an offset ($\partial$) value sufficient to move all the pixel counts in each bin into the x-th bin higher up in data value range. It is then straightforward to calculate the further modified histogram H", as $h_n'' = h'_{(n-x)}$ for all n.

In a fourth sub-step, the count values of each bin in the modified histogram are multiplied by a corresponding weighting factor and the resulting weighted bin count values summed. These Side Image (SI) weightings may be based on how effective side image reproduction is for image regions with main image data values corresponding to the data values contained within each bin. They may be calculated directly from a normalised version of the side image contrast function shown in each of FIGS. 6 to 8, quantized to the number of bins in the histogram. The summation of the resulting weighted bin count values then gives an overall Side Image Rating (SIR) for the main image, as it provides a measure of the average side image contrast available to the whole image, based on the main image data values.

In a fifth sub-step the SIR value may be compared to a target value. If it equals or exceeds the target value, the compression parameters which were used to generate the modified histogram H", are output, and these parameters are used to compress the main image, before it input to the multiview image combining process. If the SIR value is below the target value, another set of test compression parameters may be used to recalculate the modified histogram differently, and the sub-steps 2 to 4 repeated.

The test compression parameters may be trialled in such an order that the resulting degradation of the main image quality is gradually increased with successive trials until the target is met. In this way, the minimum degradation of the main image which allows satisfactory side image reproduction may be found. It may allow for an efficient calculation process of this type if the modified histogram calculation coefficient tables shown in FIG. 11 are used to calculate H' in order of increasing "Comp" value shown in that figure from Comp=0 ($h_n' = h_n$, for all n, so H'=H) to Comp=7 ($h_1' = h_1 + h_2 + h_3 + h_4 + h_5 + h_6 + h_7 + h_8$, and $h_2$ to $h_8 = 0$). It may be the case that trialling all offset parameters ($\partial$) in increments of the histogram bin width, e.g. $\partial = x \times 32$, where x is an integer from 0 to 7 for an 8 bin histogram with of equal bin widths, provides an efficient process. It may also increase process efficiency if the number of empty bins from the high data level end of the initial main image histogram H is calculated. This "room" value then specifies the number of bin width increments of $\partial$ which may be applied to the main image before any pixel data values exceed the allowed range. In this way, the number of offset parameter values which may be trialled at each trial compression value stage is simply the "room" value plus the "Comp" value. Then each possible offset value may be trialled in order of increasing value, for each compression value, also in increasing order, until the SIR value exceeds the target. This has been found to provide a steady decrease in main image quality with each set of trial values, so the least degraded main image which provides satisfactory side image reproduction is found.

Figure 12:
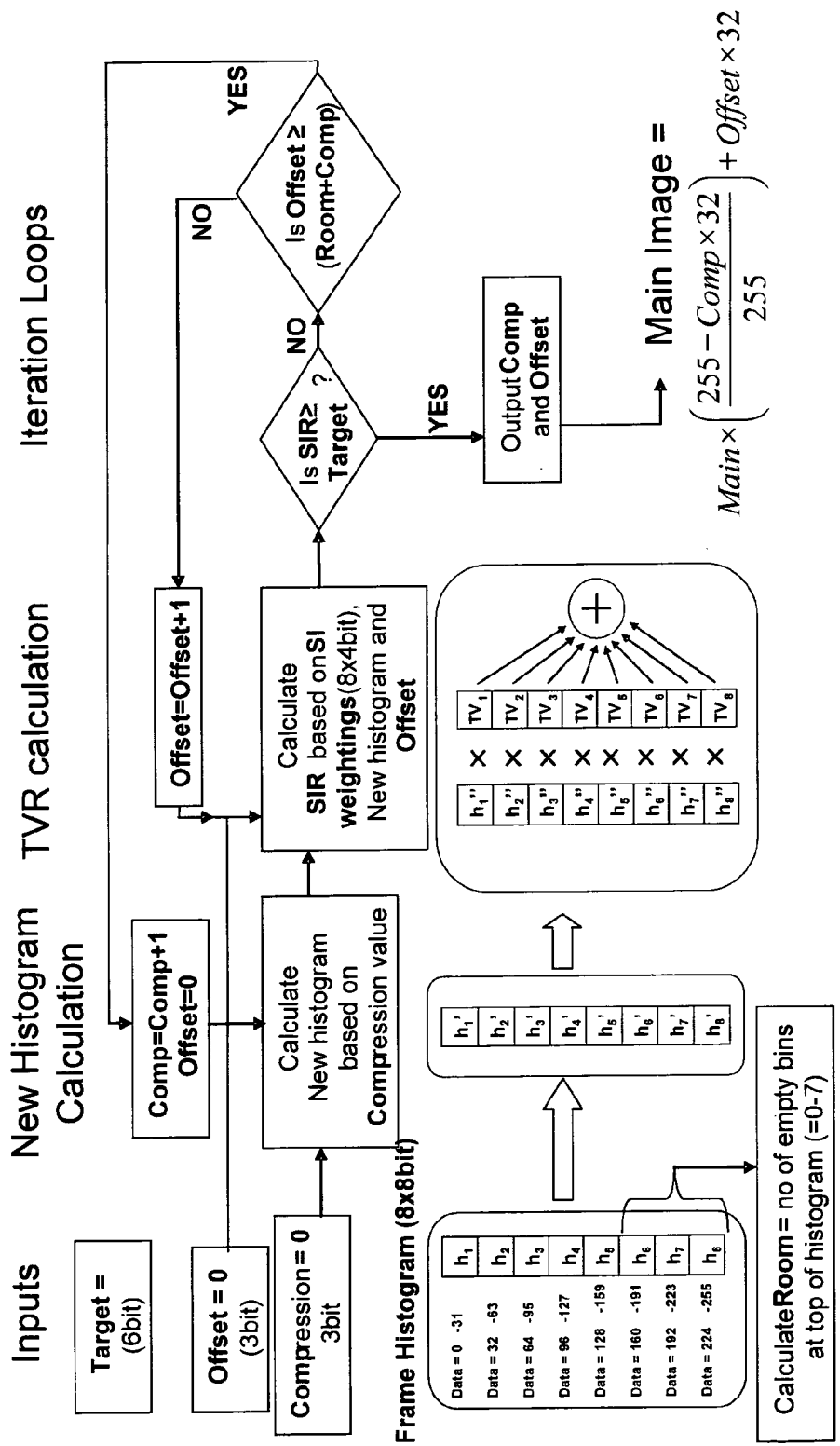
FIG. 12: is a process flow diagram illustrating the method of the preferred embodiment.

A process flow diagram illustrating the above sub-steps and order of trial value increments, with possible bit-depths given for the parameter values is given in FIG. 12.

While the above description outlines a particular method of iteratively trialling possible compression values and assessing the applicability of an image resulting from compression according to the trial values for reproducing a satisfactory side image, it is clear that there will be many variations on this method which may also be effective in determining improved compression parameters for the multiview process in dependence on the main image content, and which should be considered within the scope of this invention. Some example variations are listed below:

For example, the histogram H may be calculated by summing neighbouring data value counts into bins of variable width, in order to increase the accuracy of the parameter search process for particular regions of the image data value range.

The order of iterative compression parameter trial may be varied according to the values $h_1$ to $h_n$ of the counts in the initial main image histogram H. For example, the optimum parameters may be discovered in fewer iterations if the initial histogram, or other main image content analysis is used to guide the order of parameter search.

Rather than weighting the counts in each bin of the histogram according to some figure of merit for applicability of the pixel data values within each bin for reproducing a satisfactory side image, it may be more efficient in terms of processing to iteratively compress the main image until a set fraction of the total pixels in the image have data values within a given range (equivalent to having binary weighting factors in the preferred embodiment). Rather than iteratively compressing the image, it may be more efficient to identify the pixel data values occupying particular percentile points in the main image histogram, and compressing the main image so that these data values are shifted to the edge of the desired range. For example, the data values of the $10^{th}$ and $90^{th}$ percentile may be identified, end the image compressed such that the data value of the $10^{th}$ percentile is moved to the low edge of the specified range, and the data value of the $90^{th}$ percentile is moved to the upper edge of the range. If the range of data values between the percentile points is smaller than the specified target range, the portion of the image between the percentile point may be expanded to fill the target range, and the portions outside the percentile points compressed if necessary to keep them within the available range, or just allowed to saturate at the edge of the range.

FIG. 13 shows the result of a compression of main image pixel data representing a mostly white image, such as typical black text on a white background, carried out according to an embodiment of the present invention. This can be compared with FIG. 6, which shows the compression carried out by a previously-considered method based on the same main image pixel content. FIG. 13 shows that a much lower value for the δ parameter value (close to 0) has resulted from use of a method embodying the present invention, resulting in better main image contrast for no significant cost to the side image appearance (due to the relatively low number of main image pixels having a low data value). An equivalent visual comparison is provided in FIG. 20, showing the main image data distribution instead in histogram format; the upper illustration in FIG. 20 shows the previously-considered compression while the lower illustration in FIG. 20 shows the compression resulting from an embodiment of the present invention.

Figure 14:
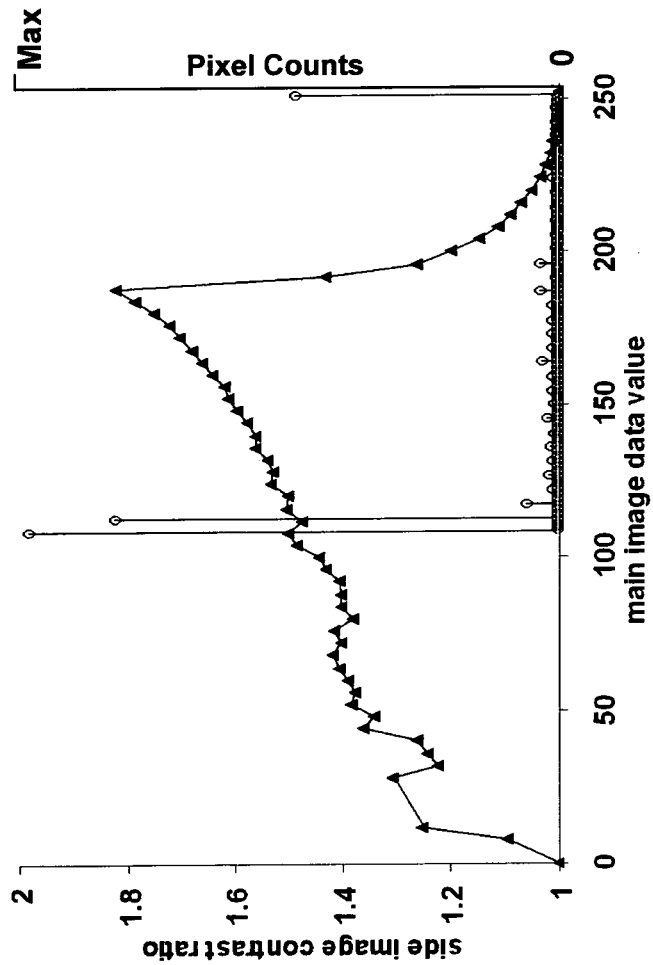
FIG. 14: shows the maximum side-image contrast ratio as a function of main image data value, with the superimposed pixel data histogram of an example main image compressed according to the method of the preferred embodiment.

FIG. 14 shows the result of a compression of main image pixel data representing a mostly black image carried out according to an embodiment of the present invention. This can be compared with FIG. 7, which shows the compression carried out by a previously-considered method based on the same main image pixel content. FIG. 7 shows the previous compression resulted in the majority of the area of the image having low side image contrast, with a weak privacy effect, but the compression carried out according to an embodiment of the present invention has placed the majority main pixel content (dark pixels) higher up the side image contrast plot, resulting in a stronger privacy effect. An equivalent visual comparison is provided in FIG. 21, showing the main image data distribution instead in histogram format; the upper illustration in FIG. 21 shows the previously-considered compression while the lower illustration in FIG. 21 shows the compression resulting from an embodiment of the present invention.

Figure 15:
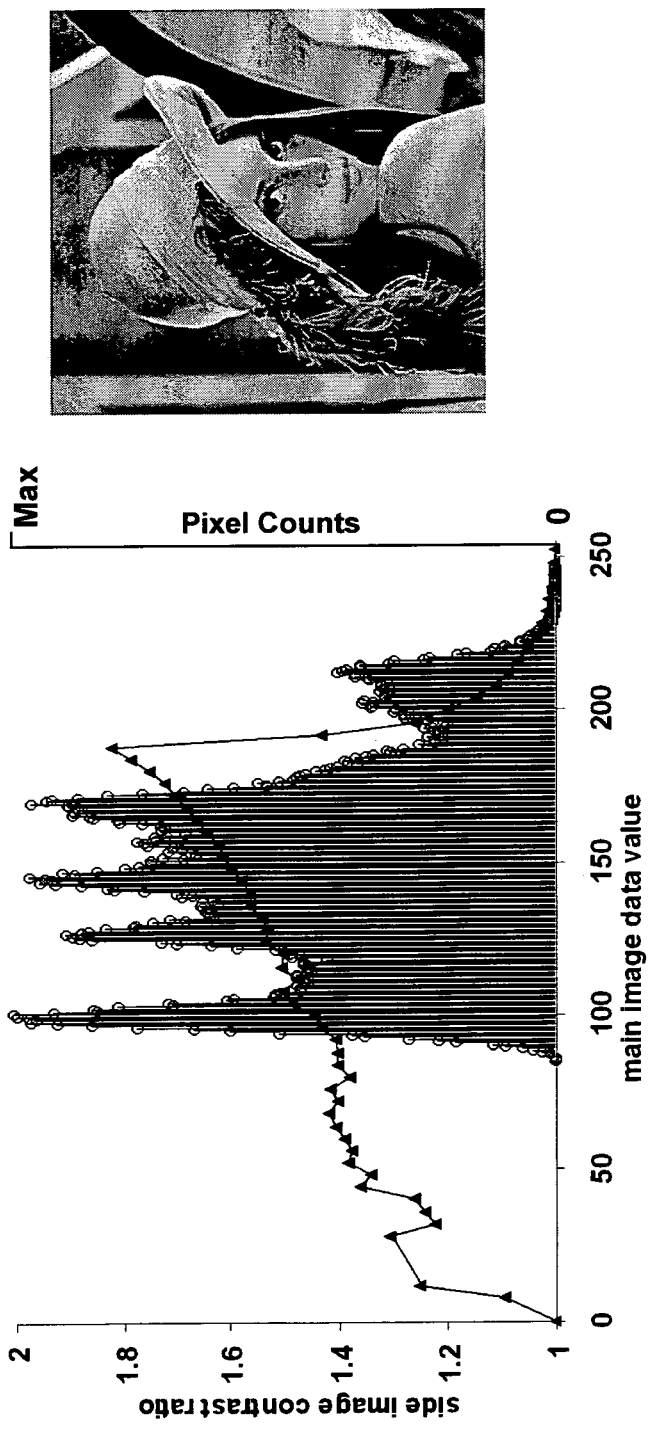
FIG. 15: shows the maximum side-image contrast ratio as a function of main image data value, with the superimposed pixel data histogram of an example main image compressed according to the method of the preferred embodiment.

FIG. 15 shows the result of a compression of main image pixel data representing an image with a wide range of data levels carried out according to an embodiment of the present invention. Again, rather than compressing the main image data distribution towards the lower end of the main image data value range, a method embodying the present invention has recognised that it is better for side image contrast if the main image data are compressed such that more of the data are placed where the side image contrast is higher. A better privacy effect is thereby achieved. This can be compared with FIG. 8, which shows the compression carried out by a previously-considered method based on the same main image pixel content. FIG. 22 provides an illustration of the compression resulting from an embodiment of the present invention applied to the same main image, but this time in histogram format.

Although the above embodiments have been described with reference to a switchable privacy method which uses spatial averaging between pairs of pixels to allow different configurations of individual pixel values within a pair that result in the same average luminance, and therefore main image appearance, to the on-axis viewer, while providing a different luminance for the different configurations to the off-axis viewer, the methods described would be equally applicable to processes in which the averaging is be performed over pixels groups larger than two.

Figure 31:
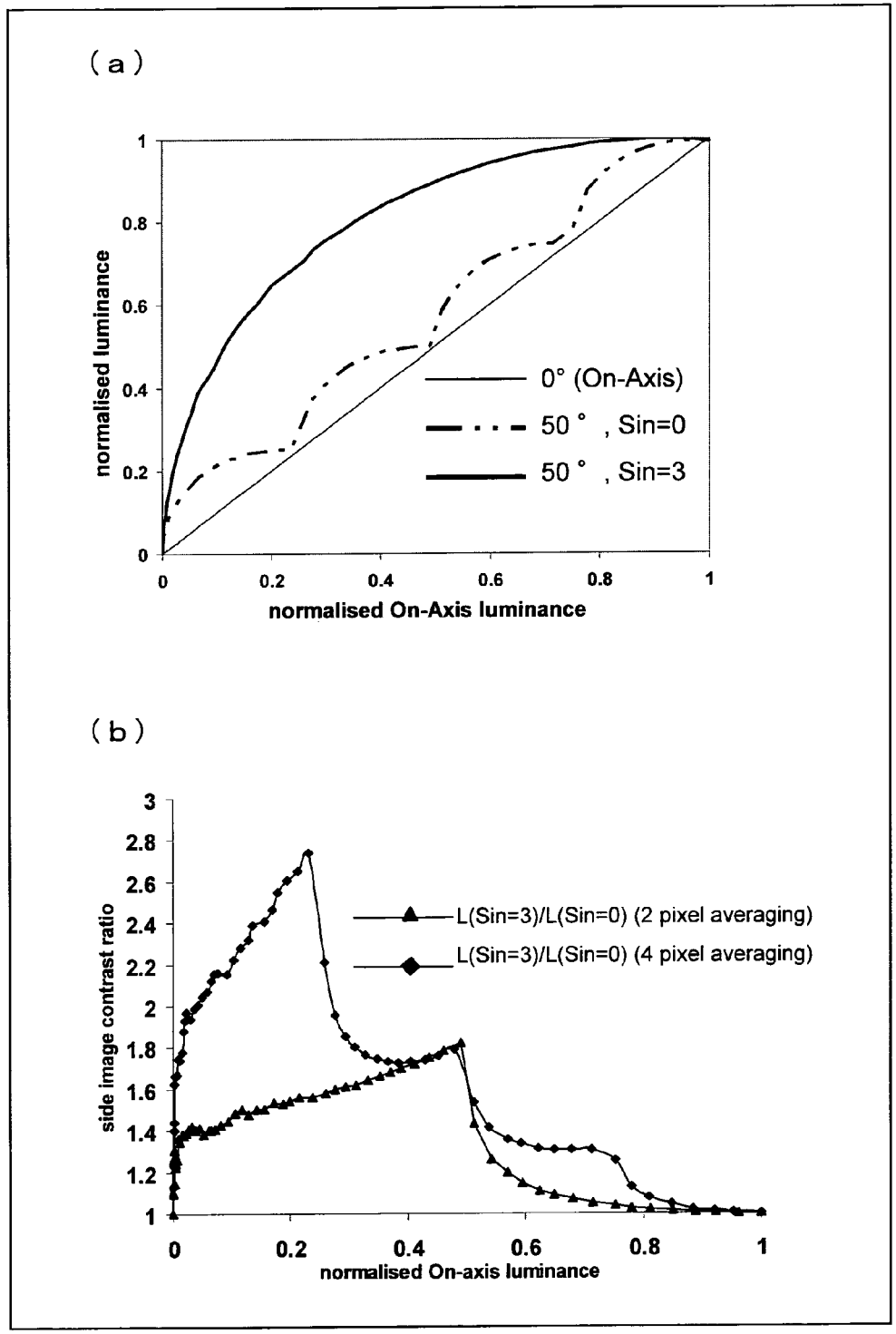
FIG. 31: is a pair of graphs illustrating the change in (a) normalised off-axis to on-axis luminance curves and (b) off-axis contrast ratios, provided by a mapping which averages luminance locally over four pixels, rather than two as in FIGS. 3 and 4.

This could be advantageous in that it may allow greater side image contrast over the range of main image values. In this case, the Side Image (SI) weightings applied to the count of each histogram bin to calculate the overall Side Image Rating (SIR) can be adjusted to reflect the change in available side image contrast as a function of main image value on going from two pixel averaging to averaging over a larger group of pixels. This effect is illustrated in FIG. 31, which shows in (a) the increased difference in maximum and minimum available off-axis to on-axis luminance characteristics for a four pixel averaging method (as opposed to the equivalent in FIG. 3 for two pixel averaging), and in (b) the resultant increase in available side image contrast ratio as a function of main image luminance.

The methods may also be applicable to processes in which the switchable privacy method uses temporal or spatial and temporal averaging of pixel brightness over two or more frames as well as, or instead of, two or more pixels in a group, in order to control the average on-axis and average off-axis brightness of the pixel independently. In the case where temporal averaging is used, it may be the case that the range of available average off-axis to on-axis luminances producible by the display, as shown in FIG. 3 for the spatial averaging method, may be altered due to the limited response speed of the display to changing image data. The relative side image contrast ratios, as illustrated in FIG. 4 for a spatial averaging method, may then also be altered. In this case, the Side Image (SI) weightings applied to the count of each histogram bin to calculate the overall Side Image Rating (SIR) may be adjusted to reflect the change in available side image contrast as a function of main image value in the altered side image contrast function resulting from the temporal averaging method.

It will be appreciated that, in any of the examples described, rather than calculating the Image (SI) weightings directly according to the side image contrast function, the weighting may be set to favour strong compression for improved privacy, and reduced compression to favour main image contrast. The weightings may be switchable, or user selectable, according to display usage or the current application, to as to adjust the main image quality/privacy strength compromise accordingly. The SI weighting parameters may also have the differences amplified in order to provide a stronger signal in the calculation of the SIR as pixel counts move from one histogram bin to another.

In a further embodiment, rather than identifying an optimum compression range for the main image based solely on the main image data, the range may be found using a combination of both the main and side image data, as illustrated by the inclusion of the dashed-line arrow of FIG. 10. This would allow the process to make use of the fact that if the main and side images happen to be very similar, little or no compression is required in order to display both images to the intended angular viewing range accurately.

In an example method of this type, for each pixel of the display the target main and side image luminance values are determined, according to the main and side image data values corresponding to that pixel in the main and side images. These target main and side image values are used to locate the target position of the pixel in the on-axis to off-axis luminance space as shown in FIG. 3. The available envelope of average on-axis and off-axis luminance values which may be simultaneously produced by a pair of neighbouring pixels is outlined by the $S_{in}=0$ and $S_{in}=3$ traces of that figure. The target position of the pixel in the off-axis to on-axis luminance space can then be defined relative to the available envelope. If the target position is within the available envelope, no compression to either the main or side image is required in order to correctly display the required on-axis and off-axis luminances of the pixel. If the target position lies outside the envelope, then some compression to one or both images must be applied to correctly display the pixel.

If the position in the off-axis to on-axis luminance space of all the pixels in the image is determined, the amount of compression of the main and side image required to bring the target position of a satisfactory proportion of all the pixels within the available envelope may be determined, and that compression then applied to the respective images.

Figure 16:
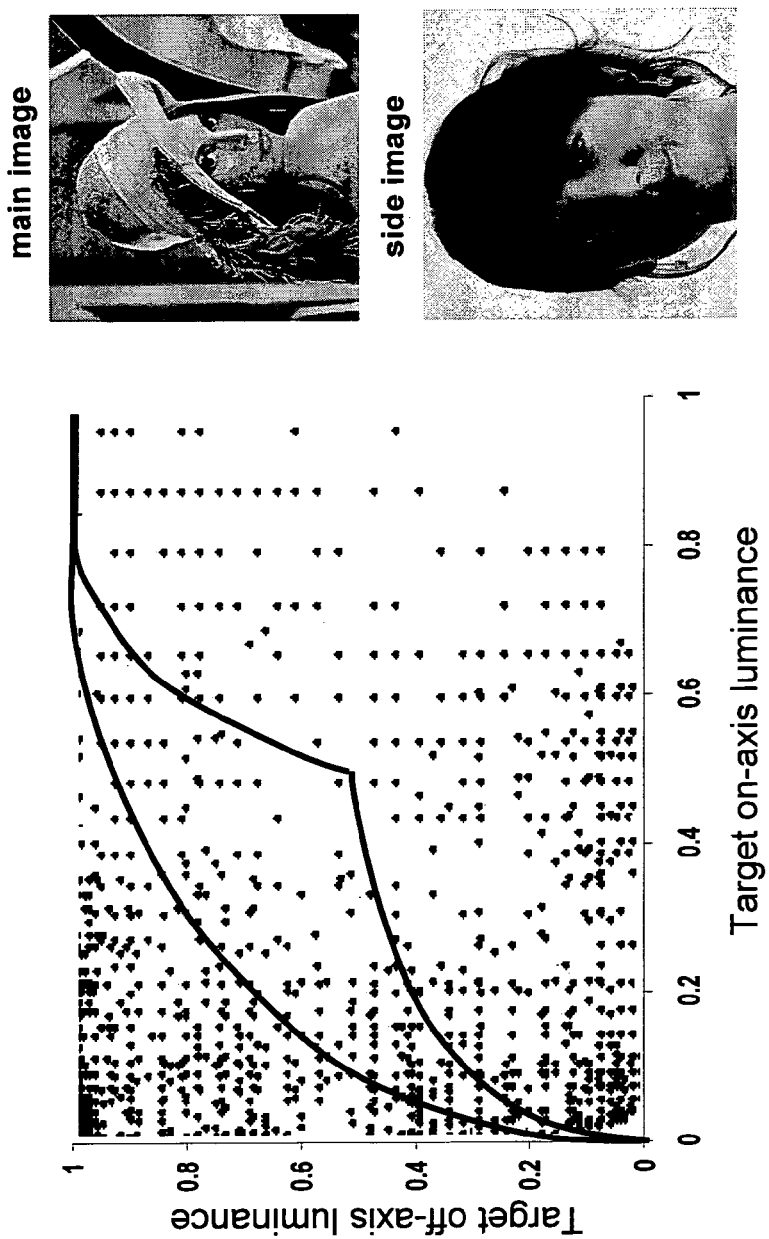
FIG. 16: is a graph illustrating the spread of target on-axis and off-axis luminances defined by a pair of example input images, in relation to the available off-axis to on-axis luminance space defined by the multiview method.

This process is illustrated by FIG. 16, which shows the off-axis to on-axis luminance points of a random selection of pixels from the main and side images shown (showing all the pixels would produce too dense a cloud of dots for illustrative purposes), as well as the outline of the available on-axis to on-axis envelope. As can be seen in the figure, with two distinct images used as the main and side images, the target points cover the majority of the off-axis to on-axis luminance area.

Figure 17:
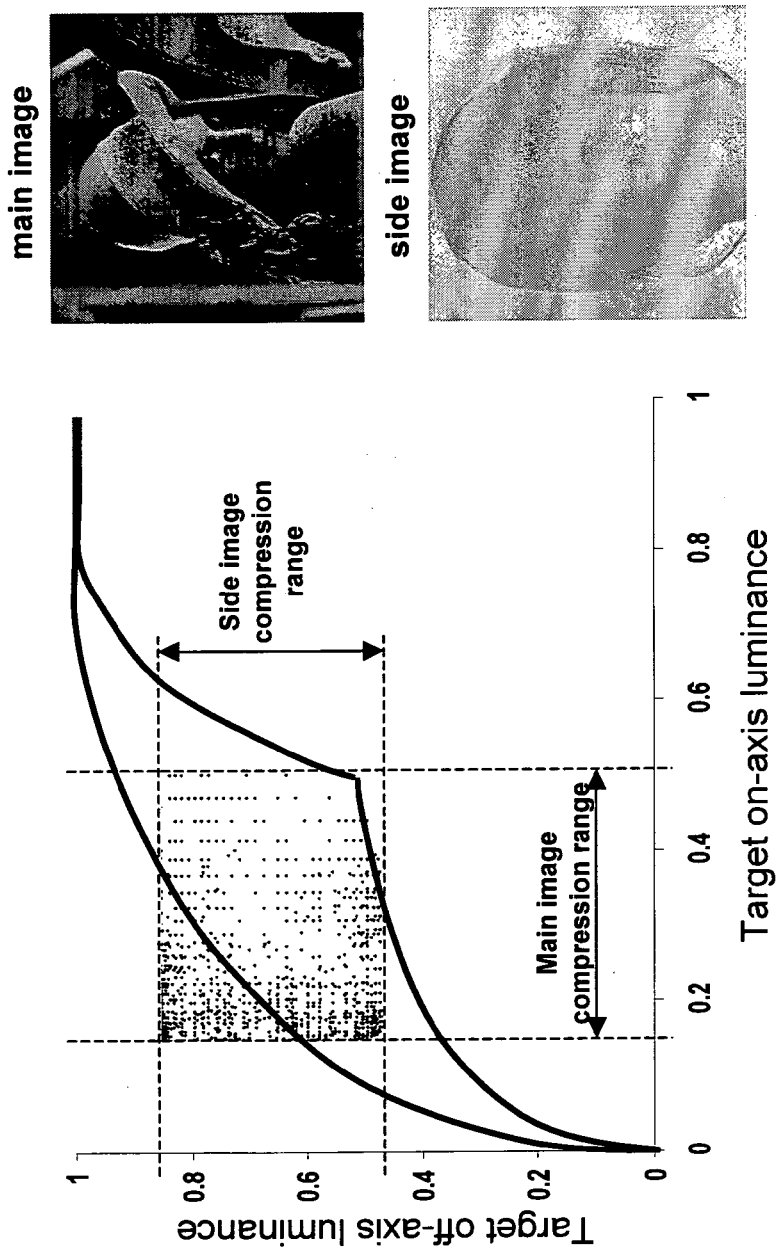
FIG. 17: is a graph illustrating the spread of target on-axis and off-axis luminances defined by a pair of example input images, after compression according to the method of a further embodiment, in relation to the available off-axis to on-axis luminance space defined by the multiview method.
Figure 32:
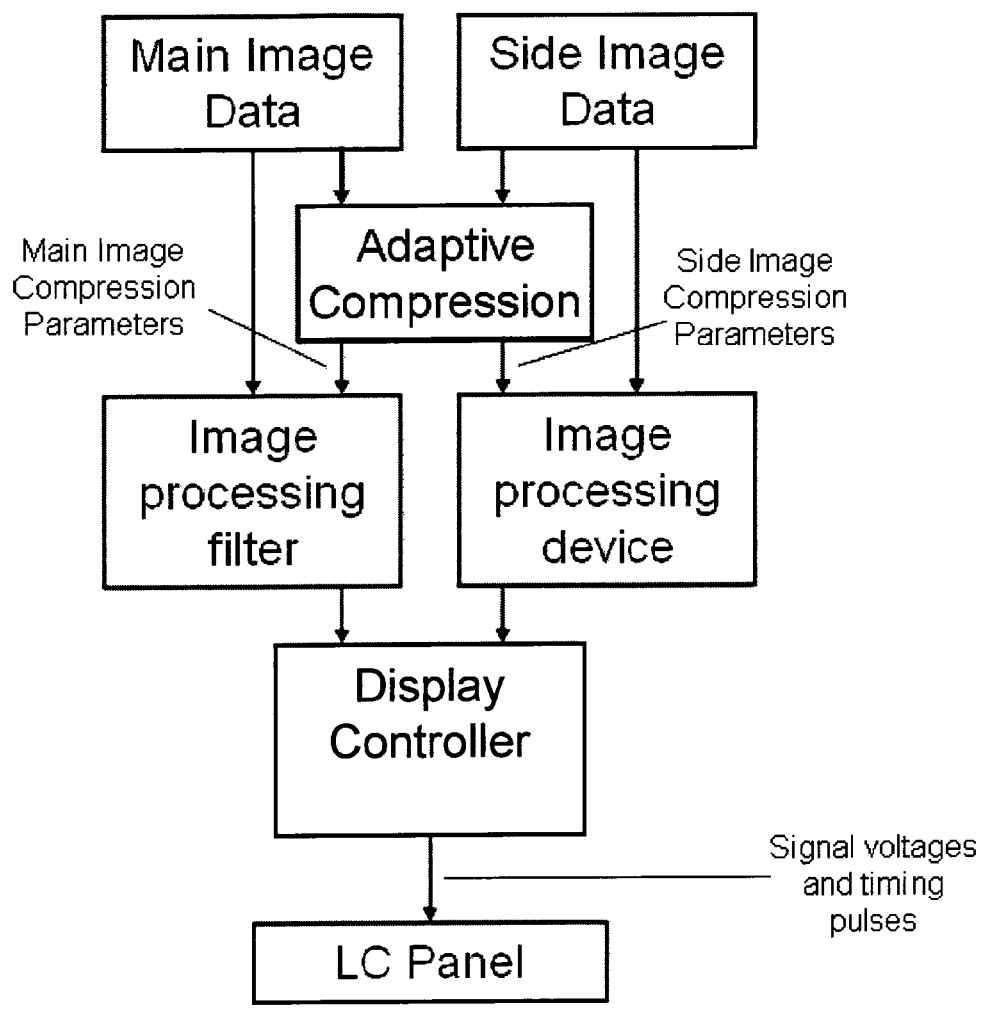
FIG. 32: shows the process flow diagram of FIG. 10 modified according to a further aspect of this invention.

FIG. 17 shows how, after compression of both the main and side image, an increased proportion of points lies within the available envelope. It is the case that in most instances, in order to preserve the maximum range of off-axis luminances allowable, the side image compression will be determined only by the allowable range of off-axis luminances for the utilised on-axis luminance values. In some cases however, for example in the situation where a strong privacy effect is required, the dependence of the off-axis luminance on the main image data value can be minimised by compressing the side image by an amount greater than required by the available envelope of values, as described in co-pending British patent application no. 0916241.3. This situation is shown in FIG. 17 in that the maximum off-axis luminance is reduced to a level below the maximum available off-axis luminance achievable where the on-axis luminance is at the maximum post-compression value, so as to bring a greater proportion of the target off-axis to on-axis luminance points with low on-axis luminance and high off-axis luminance (i.e the points in the upper-left of the scatter plot) into the achievable range. In order to achieve this, the side image compression must also be calculated in dependence on the main image and side image data, so the example process shown in FIG. 10 would need to include compression calculation for the side image also, possibly in the manner illustrated in FIG. 32.

Figure 18:
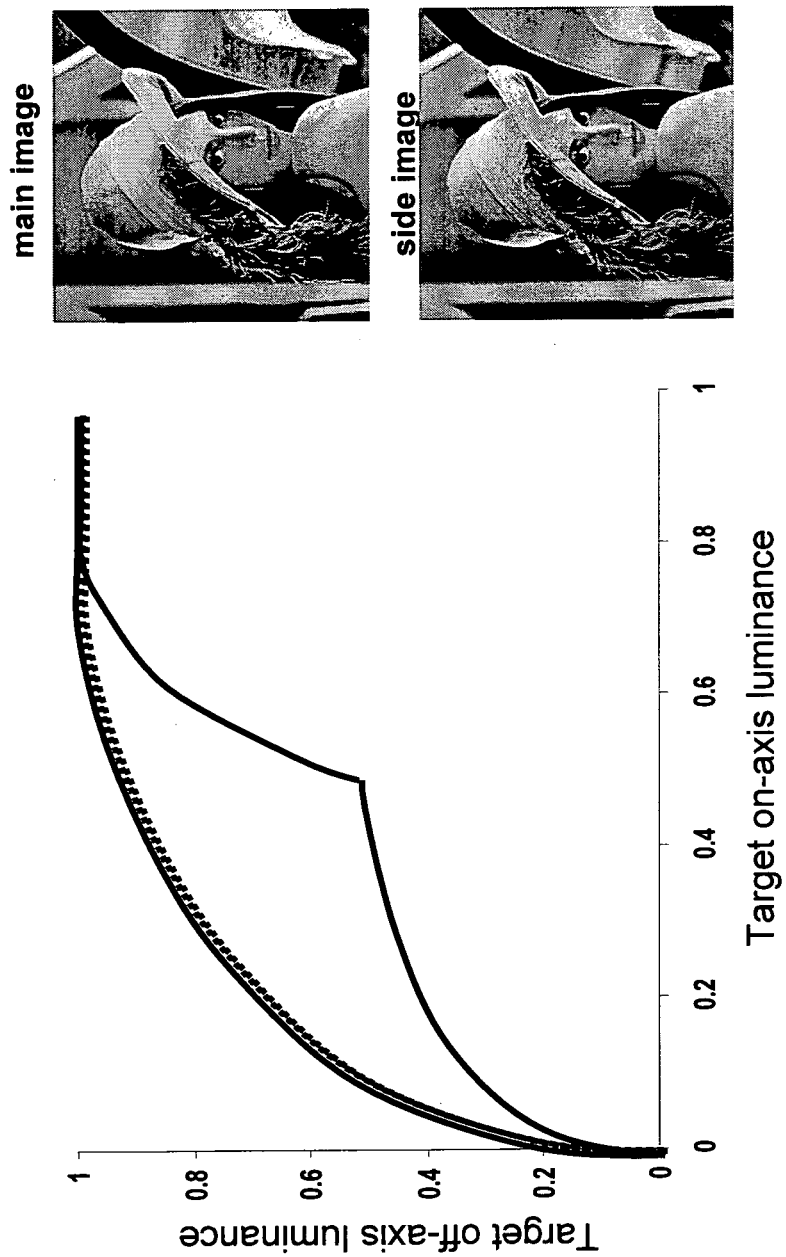
FIG. 18: is a graph illustrating the spread of target on-axis and off-axis luminances defined by a pair of example input images which are identical.

FIG. 18 shows the same "cloud" of target points diagram produced in the case of the main and side image being identical. In this case it can be seen that all the points lie inside the available envelope without any modifications necessary to the images.

Figure 29:
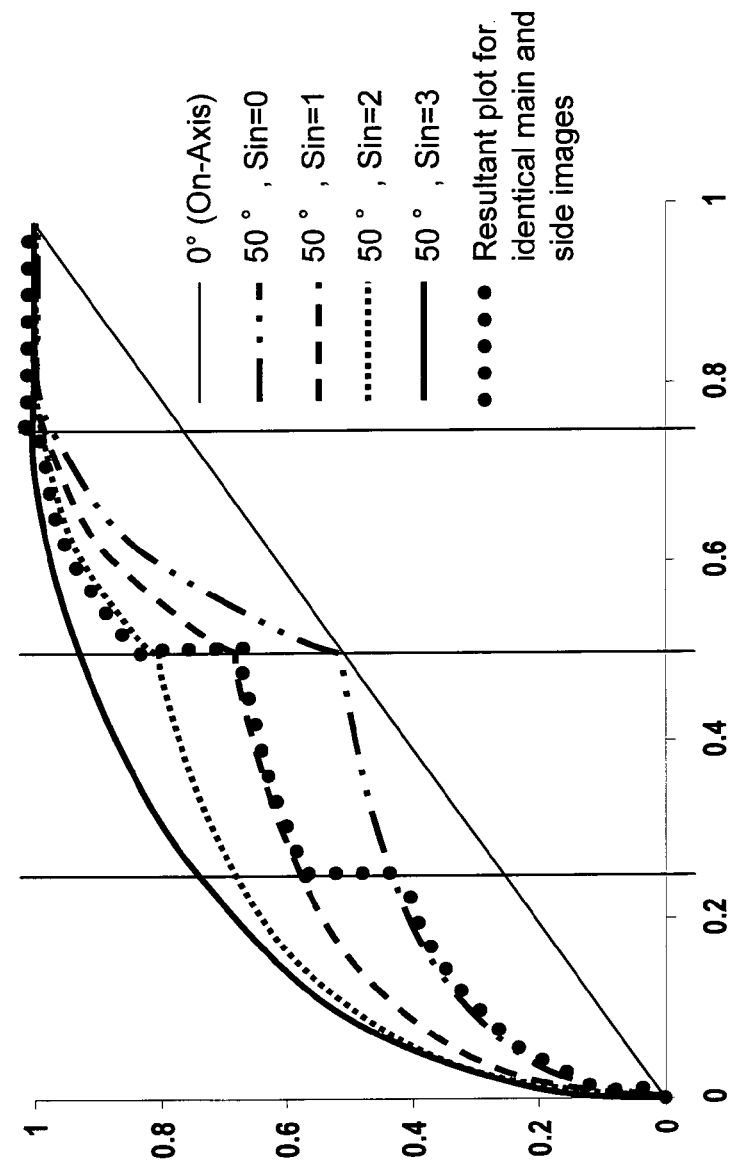
FIG. 29: illustrates the variation of off axis luminance with on axis luminance where the main and side images are the same.

FIG. 16 is a straightforward scatter plot, with each dot representing a pixel of the display, the x position determined by the luminance of the pixel in the main image, and y position by luminance of the pixel in the side image. FIG. 16 shows the spread of off-axis to on-axis luminance values for the input images, so no account of the privacy process is taken. However, the on-Axis and off-Axis gamma curves inherent to the display are taken into account. A main image pixel with a mid-grey data value results in a particular normalised luminance dependent on the gamma, and a side image pixel with the same data results in a different normalised luminance dependent on the off-axis gamma. This is the reason, that when the two images are the same, the spread of points follows the zero-splitting curve of FIG. 3; this curve is the off-axis to on-axis luminance curve inherent to the display, without any privacy process taken into account. If the scatter plot showed main image data vs side image data, rather than normalised luminance, then the resultant plot would be a straight line y=x. It is possible to perform this cloud compression technique based on such a plot, and the envelope of possible points would change shape correspondingly in conversion from luminance to data space, so that the y=x line was within the envelope. In either case, when the main image and the side image are the same, the scatter of target points would fall within the achievable envelope, so no main image compression would be required. Even though no compression is required, the privacy process would still run as normal. After the privacy process is applied, the different side image levels would be moved onto the curve corresponding to their Sin value, which—assuming the side image is divided into four equal luminance ranges as before—would result in the scatter points falling onto the bold dotted line in FIG. 29 after privacy processing.

The optimal compression required to bring the specified proportion of the target points within the available area may be achieved by a number of methods. The main and side image may be iteratively compressed, with the proportion of points within the available envelope re-assessed at each stage until the specified proportion is reached. The mean, median or some other specified percentile of the distance of each point initially outside the available envelope, from the edge of the envelope, may be determined, and used to calculate the compression of the images required. In this case, the error determined may be a vector quantity, to allow deduction of the direction of compression required in off-axis and off-axis components. The "centre of mass" of the cloud of target off-axis to on-axis luminance points may be calculated, and the images compressed and offset to align this centre of mass point with the centre of mass of the available envelope. The images may then be further compressed in such a way as to move all the target points towards the centre of mass, and by an amount required to bring the specified proportion of the points within the envelope. In order to reduce the computational load required by such a process, an equivalent set of off-axis to on-axis target points space may be produced in data, rather than luminance terms, and the data value equivalent of the available envelope may be calculated and used instead.

It can be seen that many possible methods of using the spread off-axis to on-axis target points and available envelope construction to find optimal compression parameters for the privacy/multiview process exist and the scope of the invention is not limited to those listed above, but should instead be defined by the concept and use of such a construction to allow calculation of optimal parameters, by any method, which allows the spread of both main and side image pixel values to be taken into account, as well as their degree of correlation in the images.

It is also the case that once a compression range has been identified using any of the above methods, rather than compressing the main image linearly to fit within the range, using the $\beta$ and $\partial$ scaling and offset parameters as described above, the compression of the main image to have pixel data values only within the target range may be done in a non-linear fashion (a non-linear compression is applied). For example, the data values of the edge of the target range, and the main image pixel data values, may be converted to equivalent luminance using the known gamma exponent of the display, then compressed in luminance terms before conversion back to equivalent, compressed data values.

Figure 23:
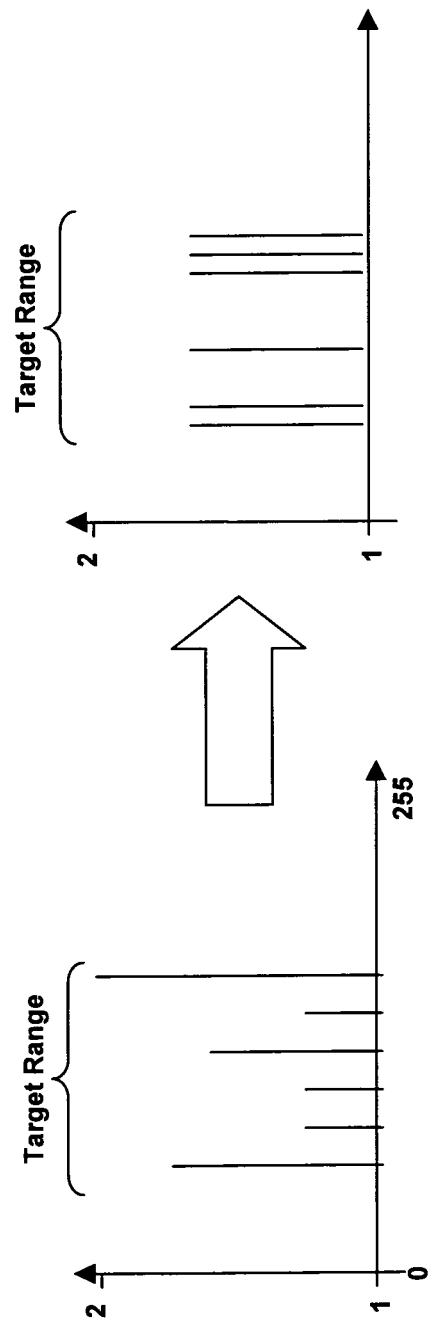
FIG. 23: illustrates the use of a histogram equalisation technique in an embodiment of the present invention.

It may also be advantageous to apply a known image processing technique, such as histogram equalisation or flattening, to the compressed image to optimise its appearance once compressed. Thus, a histogram equalisation step may be included. This histogram equalisation or other image appearance improvement technique may be incorporated into the compression step, once the target compression range has been determined using one of the above methods. This is illustrated in FIG. 23.

Figure 26:
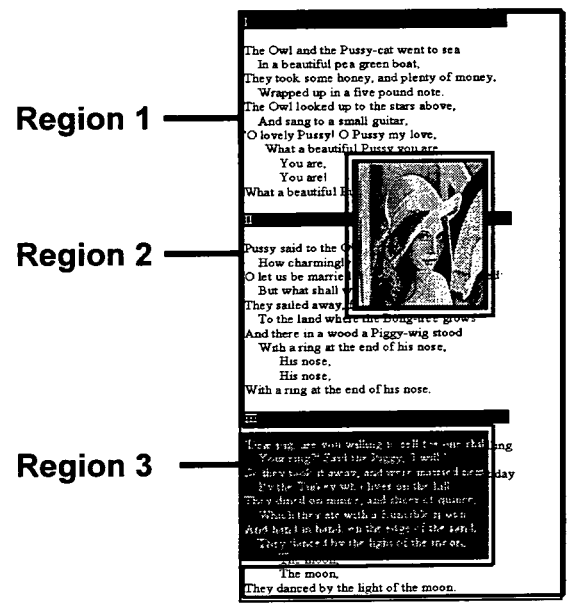
FIG. 26: illustrates the identification of a plurality of different types of region within the main image, so that different compression regimes can be applied to the different respective region types.
Figure 27:
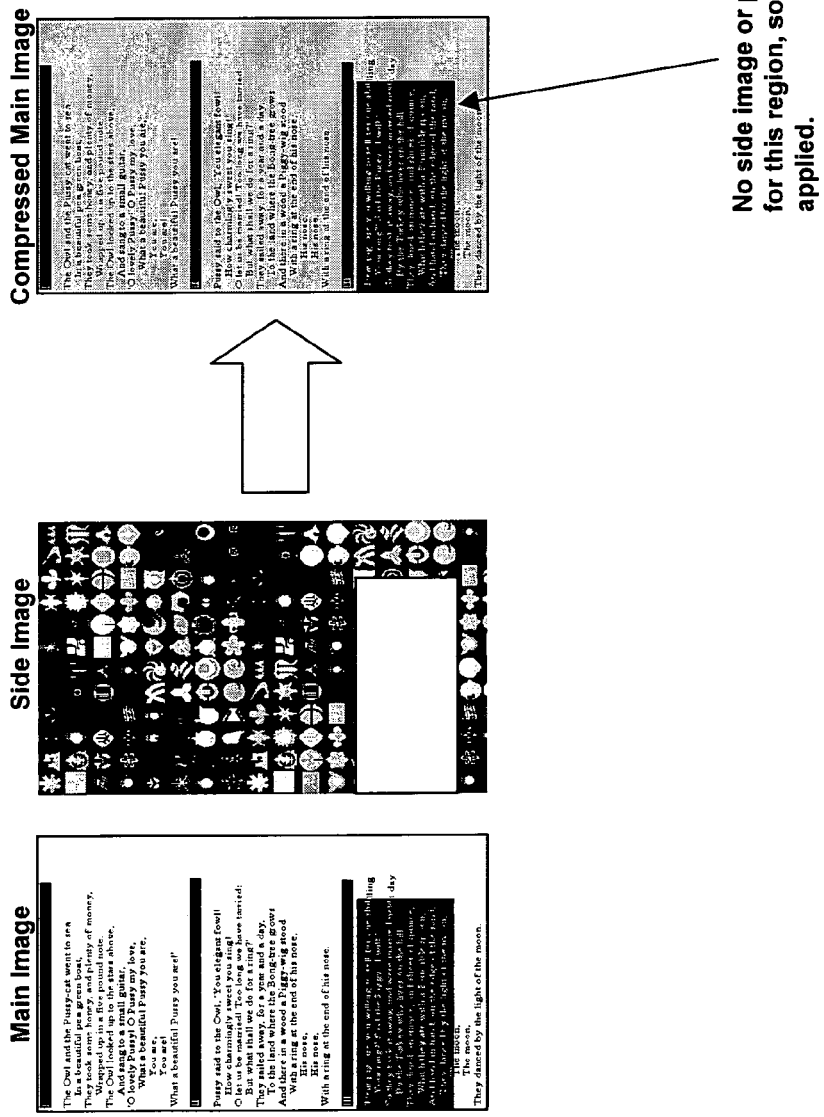
FIG. 27: illustrates the use of the side image content to control whether or not compression is applied to the main image.
Figure 28:
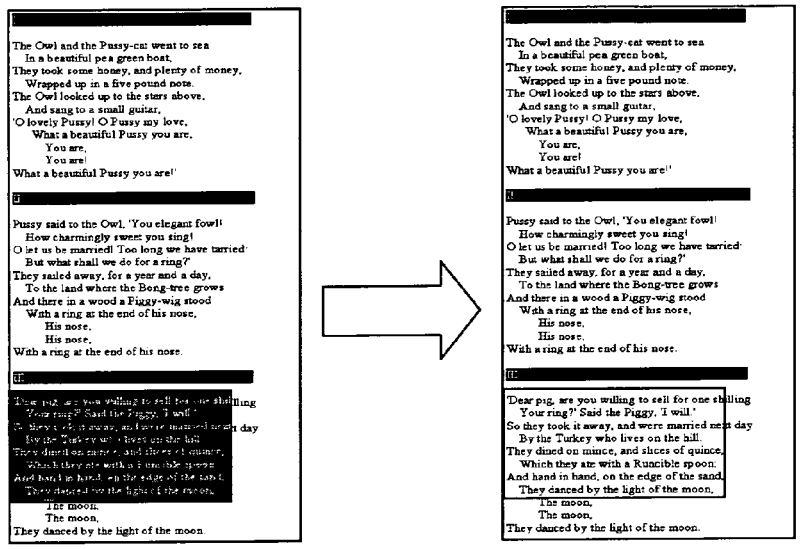
FIG. 28: illustrates the identification of a region type and the modification of the main image data within that region to make it more similar in type to another region of the main image.

In a still further embodiment, the main image content is analysed, and different image type regions are detected, as illustrated in FIG. 26. Optimal compression parameters may then be calculated according to any of the above methods for each of the regions individually, allowing a better overall compromise between main image quality and side image reproduction. Such region types may include black text on white background regions (region 1 in FIG. 26), white text on black background regions (region 3 in FIG. 26), image regions (region 2 in FIG. 26), and so on. It may also be advantageous if both white-on-black (or bright-on-dark) text regions and black-on-white (dark-on-bright) text regions are identified by the process to invert one of the regions to match the type of the other, as illustrated in FIG. 28. This reversal may always be to the preferred type of text, or may be to the type which occupies the largest region initially so as to minimise change to the image. This may then allow both regions to be compressed uniformly for an improved overall result. It may also be that a particular side image value is reserved as meaning that no privacy as required; in this case, for any region of the image covered by a side image having such a value, no image compression is applied, as illustrated in FIG. 27.

In a still further embodiment, if any of the above compression parameter calculation methods are applied on a frame-by-frame basis, the process parameters may be adjusted according to the results obtained in previous frames in order to improve the overall result. The compression parameter calculation need not take place for every frame received, but could be carried out regularly every set number of frames; for example the histogram data could be input to the compression process every four frames, with the process using the subsequent three frames to perform the calculation, before receiving a new set of data again. The histogram data may also be collected for the individual colour channels in different frames of the inter-calculation period, e.g. the histograms for the red, green and blue colour channels may be collected one per frame, taking three frames to gather the information before summing, and the calculation performed during subsequent frames.

Figure 24:
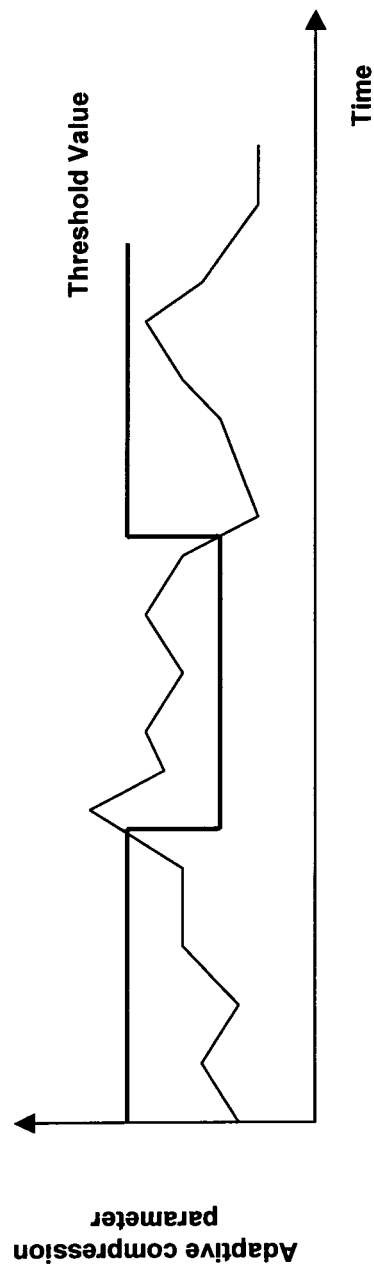
FIG. 24: illustrates the use of a hysteresis technique in an embodiment of the present invention.

The adjustment of the process parameters according to previous results may take the form of hysteresis in the process parameters in order to prevent repeated back-and-fore change in the compression parameters when the content of the input images is fluctuating around the threshold between favouring one set of compression parameters and another. For example, when the calculated compression parameters are changed in one direction (perhaps increased compression) then the threshold for changing back is reduced, so the overall image content has to change past the point which resulted in the previous set of parameters in order for them to change again. This is illustrated in FIG. 24.

Figure 25:
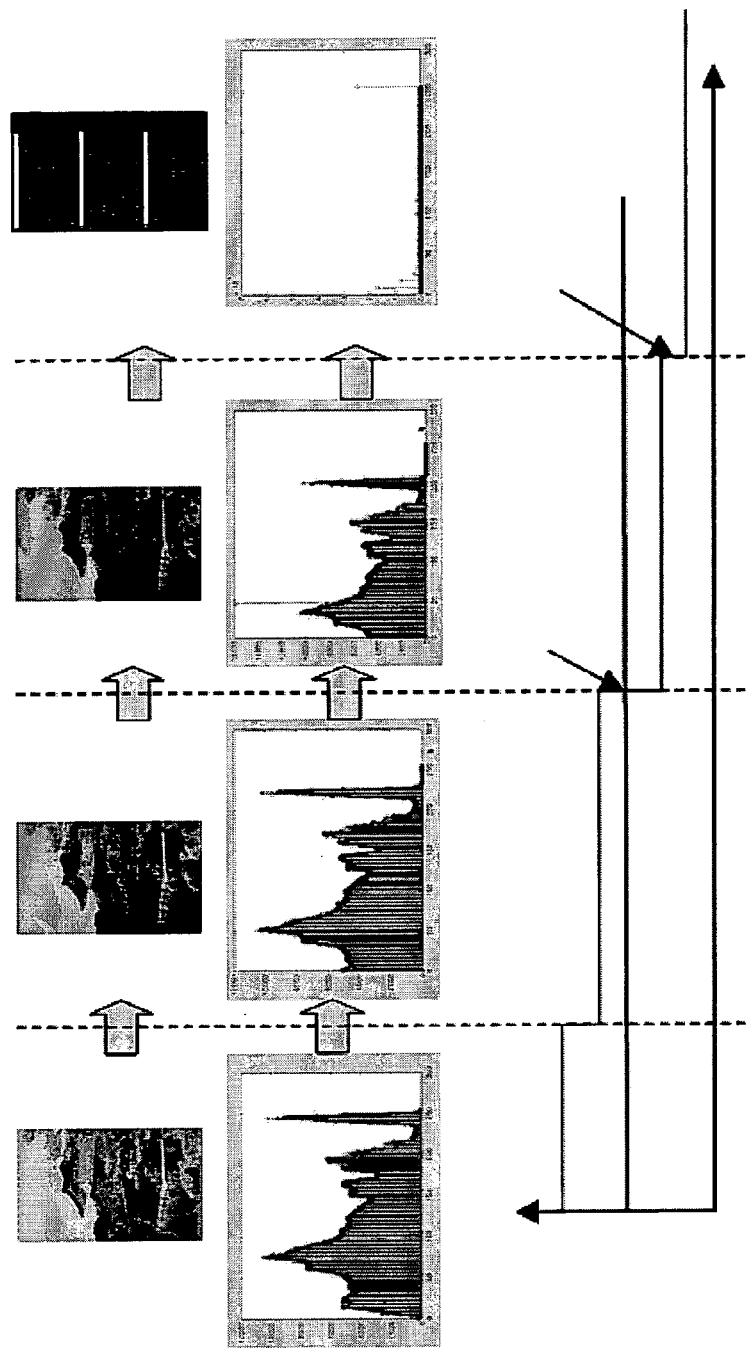
FIG. 25: illustrates the delaying of a change to the compression to coincide with a change in the main image content above a predetermined threshold.

It may take the form, particularly when video content is being observed in the display, of linking any change in the compression parameters to a scene change in the video content. For example, if a change in the compression parameters is being calculated as desirable, this change is suppressed until the content of the main image changes suddenly on a frame-by-frame basis to prevent the change in applied compression parameters from being too obtrusive to the on-axis viewer. This is illustrated in FIG. 25. This will prevent possibly distracting changes in the applied compression parameters arising from gradually varying video content. Such scene changes may be detected by a number of known means, such as comparison of the image histogram of sequential frames and summing of the overall difference in the histograms, an overall difference larger than a set amount being taken as a scene change.

Figure 30:
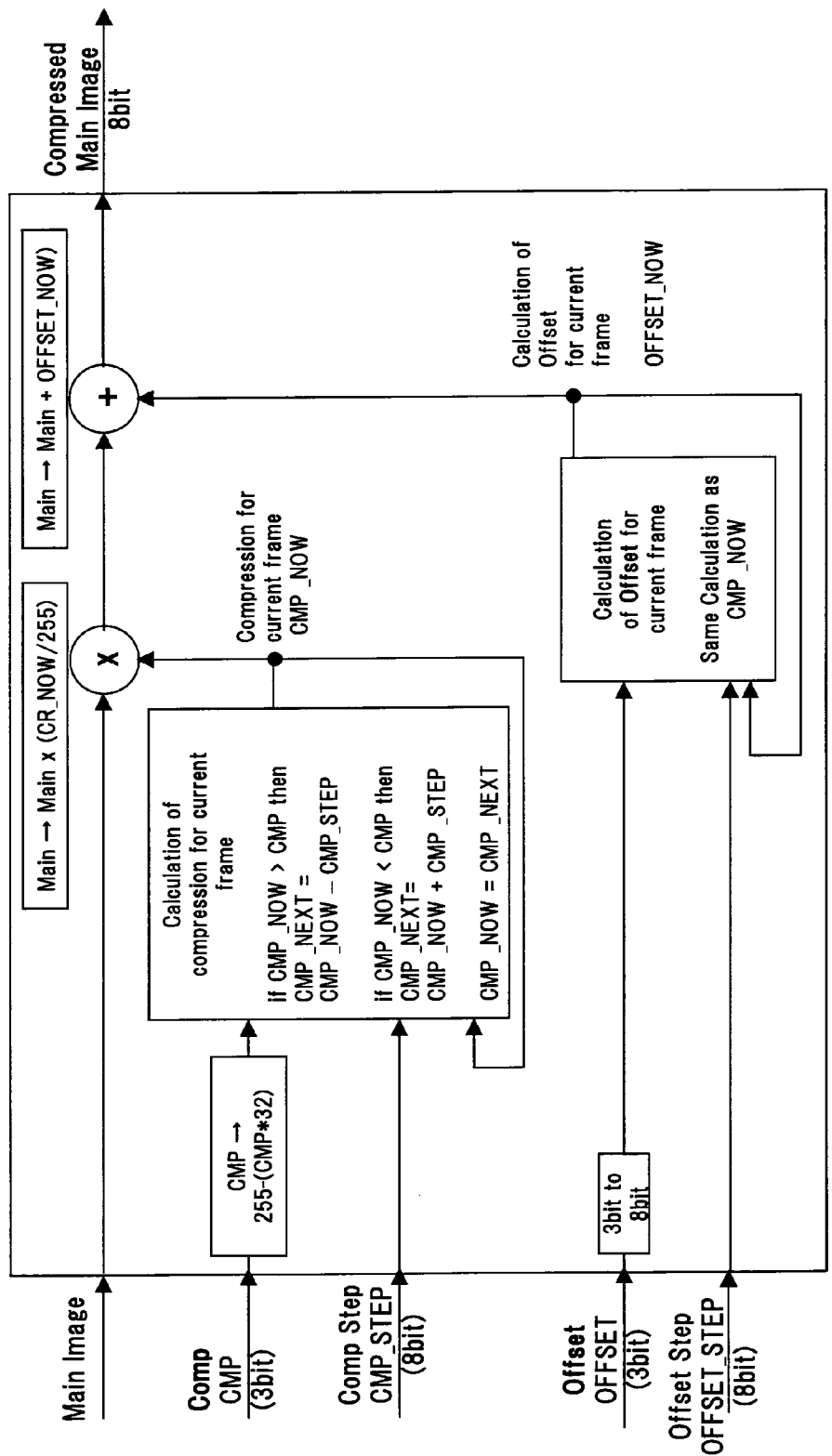
FIG. 30: is a process flow diagram illustrating an example method of gradually changing the applied image compression towards the calculated optimum.

It may also take the form of the amount of change of compression parameters being limited to a certain amount per frame. In the event of a large change in the compression parameters being calculated as desirable, the process would then calculate intermediate changes in the compression parameters to apply over a series of frames in order to make the apparent change in the observed images less obtrusive. An example block diagram for a circuit performing such a gradual change in compression parameters, towards the optimum parameters as calculated by the example process described above and illustrated in FIG. 12, over a series of frames, is given in FIG. 30.

It will be appreciated that, although it is normal to provide a display device which is capable of operating in both public and private modes and switchable between the two modes, the present invention is applicable to display devices capable of operating only in the private mode.

Although iterative compression techniques are described for use in an embodiment of the present invention, it is perfectly feasible for the final compression to be determined in a single step, based for example on a comparison between the main image content and the contrast ratio distribution. Where a single step is performed, rather than an iterative process, although FIG. 10 shows the adaptive compression being carried out as a separate step before the privacy/multiview mapping performed by the display controller, it is also possible that at least some of the adaptive compression is carried out as part of the privacy/multiview mapping. For example, GB2457106A describes the use of a lookup table (LUT) to perform the mapping of the main image data and the side image data, and it will be apparent that at least part of the adaptive compression can be incorporated into the LUT itself. A plurality of different LUTs could be provided, one of which would be selected based on a classification of image content; for example different LUTs might be provided for "mainly dark original", "mainly bright original", and "mixed brightness original", each incorporating a different type of adaptive mapping. As an alternative, one could repopulate the LUT mapping based on the main image content, although this would be more computationally intensive.

Figure 33:
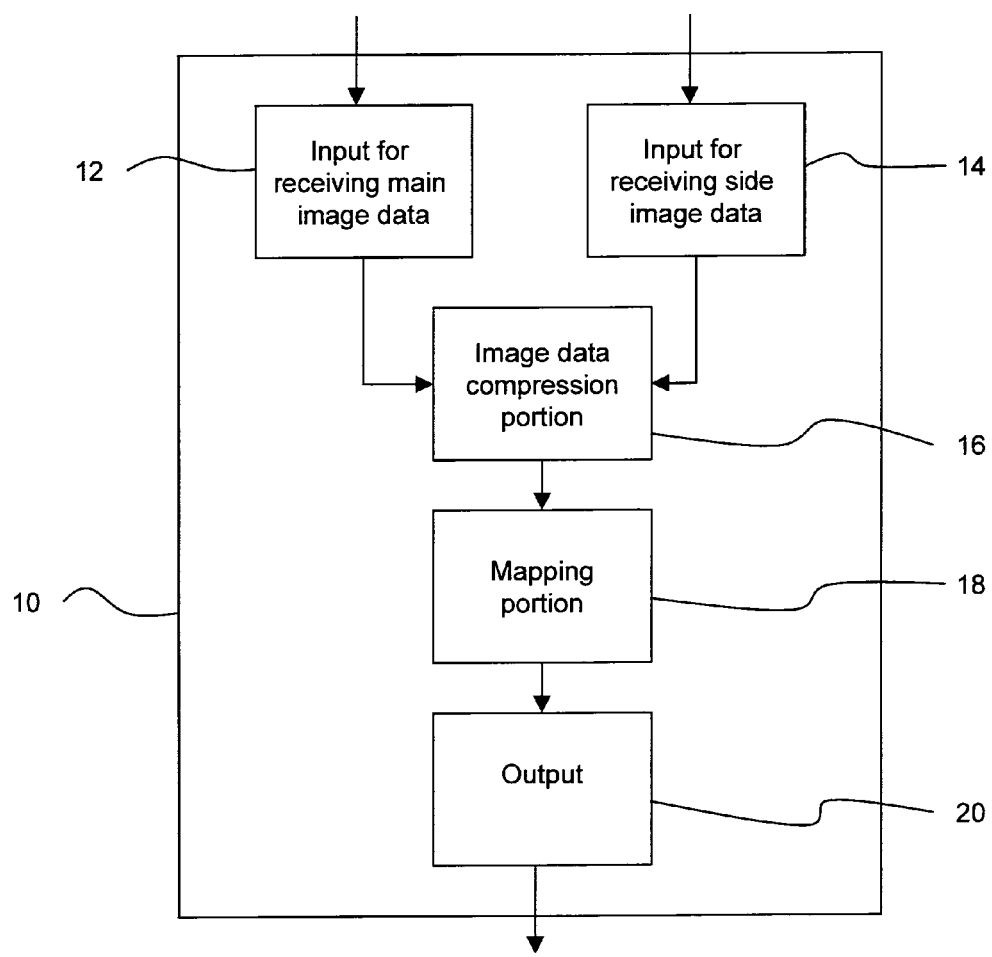
FIG. 33: schematically illustrates apparatus embodying the present invention.

FIG. 33 shows an overview of apparatus 10 according to an embodiment of the present invention. The apparatus 10 comprises an input 12 for receiving main image data, an input 14 for receiving side image data, an image data compression portion 16, a mapping portion 18, and an output 20. The apparatus 10 is adapted to perform a method of processing image data for display by a display panel of a display device. The inputs 12 and 14 are arranged respectively to receive main image pixel data representing a main image and side image pixel data representing a side image. The mapping portion 18 is arranged to perform a mapping of the pixel data to signals used to drive the display panel. The mapping is arranged to produce an average on-axis luminance which is dependent mainly on the main image pixel data and an average off-axis luminance which is dependent at least to some extent on the side image pixel data. The image data compression portion 16 is arranged to perform a compression of the main image pixel data at least partly in dependence upon the main image pixel data and at least partly in dependence upon how the off-axis luminance varies with pixel data input to the mapping. The compression is performed in advance of or at least partly incorporated into the mapping. The result of the mapping is made available at the output 20, and is for use in driving the display panel of the display device. Parts 12, 14, 16, and 18 correspond respectively to the parts of FIGS. 10 and 32 entitled "main image data", "side image data", "adaptive compression", and "display controller". The part marked 20 in FIG. 33 corresponds to the output from the part marked "display controller" of FIGS. 10 and 32. It will be appreciated that the apparatus 10 effectively incorporates the display controller of FIGS. 10 and 32, and hence can be used as the display controller 1 in a display device such as that illustrated in FIG. 19.

While the above description has referred to compression of the main image pixel data, it will be readily apparent that it can also be beneficial for some types of main image that the compression is actually a negative compression (or expansion/stretching) of the main image data range. This might be the case, for example, where the main image is of very low contrast initially, with a very narrow distribution of main image data.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

Some embodiments of the present invention disclose methods in which the main image pixel data may be compressed such that all of, or at least a predetermined proportion of, the main image pixel data are compressed into a range of on-axis luminances, the range being determined at least partly in dependence upon the main image pixel data.

Some embodiments of the present invention disclose methods in which the mapping may be arranged to produce an average off-axis luminance which is dependent on the side image pixel data with at least some dependence on the main image pixel data such that a measure of the range of possible off-axis luminances, produced by changes in the side image pixel data, varies with main image pixel data.

Some embodiments of the present invention disclose methods in which the range may be determined so that the measure is above a predetermined level and/or exhibits a variation below a predetermined level across the range.

Some embodiments of the present invention disclose methods in which the main image pixel data may be compressed so as to tend to place more main image pixel data where the range of possible off-axis luminances is greater.

Some embodiments of the present invention disclose methods that may comprise weighting each of at least some the main image pixel data by a value determined in dependence upon the measure corresponding to the main image pixel data, and compressing the main image pixel data so as to tend to optimise, for example maximise, a sum of the weighted values.

Some embodiments of the present invention disclose methods in which the measure may relate to a ratio of the highest available off-axis luminance to the lowest available luminance.

Some embodiments of the present invention disclose methods in which the compression may be performed at least partly in dependence upon the side image pixel data.

Some embodiments of the present invention disclose methods in which the main image pixel data may be compressed such that, for each of a predetermined proportion of main image pixels, an equivalent luminance value of its spatially corresponding side image pixel falls within the possible range of off-axis luminances for the main image pixel, at least when a same compression is applied to all spatially corresponding side image pixel equivalent luminance values.

Some embodiments of the present invention disclose methods in which the equivalent luminance value for a side image pixel may be that which would be observed off axis if the side image pixel were used as a main image pixel in the mapping, for example without any compression of main image pixel distribution.

Some embodiments of the present invention disclose methods in which some form of lower limit may be set on the spread of the compressed main image pixel data, in order to preserve on axis contrast. Some form of lower limit may be set on the spread of the compressed equivalent luminance values, in order to preserve off axis contrast. Where an iterative compression process is performed (see below), with gradually increasing amounts of compression applied, this may be achieved by stopping the iterative process before too much compression is applied.

Some embodiments of the present invention disclose methods in which the compression may comprise performing an iterative process, and wherein the iterative process is guided by a predetermined measure of side image quality.

Some embodiments of the present invention disclose methods in which a plurality of compressions may be trialled iteratively, substantially in order of increasing main image degradation, until the predetermined measure of side image quality reaches a predetermined threshold.

Some embodiments of the present invention disclose methods in which a single compression of the main image pixel data may be carried out based upon the trial compressions, for example according to the final trial compression or any one of the trial compressions where the predetermined measure of side image quality exceeded the predetermined threshold. Alternatively, each trial compression may comprise performing an actual compression of the main image pixel data.

Some embodiments of the present invention disclose methods in which the predetermined measure may relate to the above-described sum of the weighted values.

Some embodiments of the present invention disclose methods in which the predetermined measure of side image quality may be balanced against a measure of main image degradation.

Some embodiments of the present invention disclose methods in which the main image pixel data may be grouped into a plurality of data value or luminance ranges fewer than the number of data value levels available for the main image pixel data, and the compression may be performed based on the main image pixel data groupings rather than on individual pixel data values.

Some embodiments of the present invention disclose methods that may comprise a histogram equalisation step.

Some embodiments of the present invention disclose methods that may comprise applying a non-linear compression.

Some embodiments of the present invention disclose methods that may comprise identifying a plurality of regions of the main image and applying a different compression to the different regions.

Some embodiments of the present invention disclose methods that may comprise inverting or otherwise processing the main image data of at least one of the regions to give it a distribution more similar to that in at least on of the other regions.

Some embodiments of the present invention disclose methods that may comprise performing the method for each of a plurality of frames received in time sequence, each frame comprising or specifying or relating to a main image and a side image.

Some embodiments of the present invention disclose methods in which the compression performed for each frame may be dependent on the compression performed for at least one previous frame in the time sequence.

Some embodiments of the present invention disclose methods in which the compression performed for each frame may be dependent on a degree to which the main and/or side image has changed from a previous frame in the time sequence.

Some embodiments of the present invention disclose methods that may comprise delaying at least part of a change in compression until and/or substantially to coincide with a change in the main image is detected which is above a predetermined threshold level.

Some embodiments of the present invention disclose methods that may comprise setting a limit on the extent to which the compression can change over a number of frames, for example from one to the next, and/or applying a change to the compression over that number of frames.

Some embodiments of the present invention disclose methods that may be performed every n frames, where n is an integer greater than or equal to 1.

Some embodiments of the present invention disclose methods in which the compression may be determined to be a negative compression for at least one set of main image pixel data. A negative compression is equivalent to an expansion or stretching.

It will also be appreciated by the person of skill in the art that various modifications may be made to the above-described embodiments without departing from the scope of the present invention as defined by the appended claims.

The invention claimed is:

1. A method of processing image data for display by a display panel of a display device, comprising:
   receiving main image pixel data representing a main image and side image pixel data representing a side image;
   using a controller to perform a mapping of the pixel data to signals used to drive the display panel,
   wherein the mapping is arranged to produce an average on-axis luminance which is dependent mainly on the main image pixel data and an average off-axis luminance which is dependent at least to some extent on the side image pixel data; and
   performing a compression of the main image pixel data at least partly in dependence upon the main image pixel data and at least partly in dependence upon how the off-axis luminance varies with pixel data input to the mapping, where the compression is performed in advance of or at least partly incorporated into the mapping.

2. A method as claimed in claim 1, wherein the main image pixel data are compressed such that all of, or at least a predetermined proportion of, the main image pixel data are compressed into a range of on-axis luminances determined at least partly in dependence upon the main image pixel data.

3. A method as claimed in claim 2 wherein the mapping is arranged to produce an average off-axis luminance which is dependent on the side image pixel data with at least some dependence on the main image pixel data such that a measure of the range of possible off-axis luminances, produced by changes in the side image pixel data, varies with main image pixel data.

4. A method as claimed in claim 3, wherein the range is determined so that at least one of the measure is above a predetermined level or the measure exhibits a variation below a predetermined level across the range.

5. A method as claimed in claim 4, wherein the measure relates to a ratio of the highest available off-axis luminance to the lowest available luminance.

6. A method as claimed in claim 3, wherein the main image pixel data are compressed so as to tend to place more main image pixel data where the range of possible off-axis luminances is greater.

7. A method as claimed in claim 6, comprising weighting each of at least some the main image pixel data by a value determined in dependence upon the measure corresponding to the main image pixel data, and compressing the main image pixel data so as to tend to optimise, a sum of the weighted values.

8. A method as claimed in claim 7, wherein the compression comprises performing an iterative process, and wherein the iterative process is guided by a predetermined measure of side image quality.

9. A method as claimed in claim 8, wherein a plurality of compressions are trialled iteratively, in order of increasing main image degradation, until the predetermined measure of side image quality reaches a predetermined threshold.

10. A method as claimed in claim 9, wherein a single compression of the main image pixel data is carried out based upon the trial compressions.

11. A method as claimed in claim 9, wherein each trial compression comprises performing an actual compression of the main image pixel data.

12. A method as claimed in claim 8, wherein the predetermined measure relates to the sum of the weighted values.

13. A method as claimed in claim 8, wherein the predetermined measure of side image quality is balanced against a measure of main image degradation.

14. A method as claimed in claim 3, wherein the compression is performed at least partly in dependence upon the side image pixel data.

15. A method as claimed in claim 14, wherein the main image pixel data are compressed such that, for each of a predetermined proportion of main image pixels, an equivalent luminance value of its spatially corresponding side image pixel falls within the possible range of off-axis luminances for the main image pixel, at least when a same compression is applied to all spatially corresponding side image pixel equivalent luminance values.

16. A method as claimed in claim 15, wherein the equivalent luminance value for a side image pixel is that which would be observed off axis if the side image pixel were used as a main image pixel in the mapping.

17. A method as claimed in claim 15, wherein some form of lower limit is set on the spread of the compressed main image pixel data, in order to preserve on axis contrast.

18. A method as claimed in claim 17, wherein some form of lower limit is set on the spread of the compressed equivalent luminance values, in order to preserve off axis contrast.

19. A method as claimed in claim 1, wherein the main image pixel data are grouped into a plurality of data value or luminance ranges fewer than the number of data value levels available for the main image pixel data, and the compression is performed based on the main image pixel data groupings rather than on individual pixel data values.

20. A method as claimed in claim 19, comprising a histogram equalisation step.

21. A method as claimed in claim 1, comprising applying a non-linear compression.

22. A method as claimed in claim 1, comprising identifying a plurality of regions of the main image and applying a different compression to the different regions.

23. A method as claimed in claim 22, comprising inverting or otherwise processing the main image data of at least one of the regions to give it a distribution more similar to that in at least one of the other regions.

24. A method as claimed in claim 1, comprising performing the method for each of a plurality of frames received in time sequence, each frame specifying a main image and a side image.

25. A method as claimed in claim 24, wherein the compression performed for each frame is dependent on the compression performed for at least one previous frame in the time sequence.

26. A method as claimed in claim 24, wherein the compression performed for each frame is dependent on at least one of a degree to which the main image has changed from a previous frame in the time sequence or a degree to which the side image has changed from a previous frame in the time sequence.

27. A method as claimed in claim 26, comprising at least one of delaying at least part of a change in compression until a change in the main image is detected which is above a predetermined threshold level or delaying at least part of a change in compression to coincide with a change in the main image is detected which is above a predetermined threshold level.

28. A method as claimed in claim 24, comprising at least one of setting a limit on the extent to which the compression can change over a number of frames, or applying a change to the compression over that number of frames.

29. A method as claimed in claim 24, wherein the method is performed every n frames, where n is an integer greater than or equal to 1.

30. A method as claimed in claim 1, wherein the compression is determined to be a negative compression for at least one set of main image pixel data.

31. An apparatus for processing image data for display by a display panel of a display device, comprising: means for receiving main image pixel data representing a main image and side image pixel data representing a side image; means for performing a mapping of the pixel data to signals used to drive the display panel, wherein the mapping is arranged to produce an average on-axis luminance which is dependent mainly on the main image pixel data and an average off-axis luminance which is dependent at least to some extent on the side image pixel data; and means for performing a compression of the main image pixel data at least partly in dependence upon the main image pixel data and at least partly in dependence upon how the off-axis luminance varies with pixel data input to the mapping, where the compression is performed in advance of or at least partly incorporated into the mapping.

32. A display device comprising an apparatus as claimed in claim 31.

* * * * *